(12) United States Patent
Drebin et al.

(10) Patent No.: US 6,639,595 B1
(45) Date of Patent: Oct. 28, 2003

(54) ACHROMATIC LIGHTING IN A GRAPHICS SYSTEM AND METHOD

(75) Inventors: Robert A. Drebin, Palo Alto, CA (US); Yoshitaka Yasumoto, Osaka (JP); Martin Hollis, Cambridge (GB); Eric Demers, Redwood City, CA (US)

(73) Assignee: Nintendo Co., Ltd., Kyoto (JP)

( * ) Notice: Subject to any disclaimer, the term of this patent is extended or adjusted under 35 U.S.C. 154(b) by 128 days.

(21) Appl. No.: 09/726,216

(22) Filed: Nov. 28, 2000

Related U.S. Application Data
(60) Provisional application No. 60/227,007, filed on Aug. 23, 2000.

(51) Int. Cl.[7] ............................................... G06T 15/60
(52) U.S. Cl. ..................... 345/426; 345/582; 345/589; 345/520; 345/420
(58) Field of Search ................................. 345/426, 582, 345/419, 522, 420, 589

(56) References Cited

U.S. PATENT DOCUMENTS

| | | |
|---|---|---|
| 4,275,413 A | 6/1981 | Sakamoto et al. |
| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 5,016,183 A | 5/1991 | Shyong |
| 5,097,427 A | 3/1992 | Lathrop et al. |
| 5,136,664 A | 8/1992 | Bersack et al. |
| 5,170,468 A | 12/1992 | Shah et al. |
| 5,361,386 A | 11/1994 | Watkins et al. |
| 5,392,385 A | 2/1995 | Evangelisti et al. |
| 5,392,393 A | 2/1995 | Deering |

(List continued on next page.)

FOREIGN PATENT DOCUMENTS

| | | |
|---|---|---|
| CA | 2070934 | 12/1993 |
| EP | 1 074 945 | 2/2001 |

(List continued on next page.)

OTHER PUBLICATIONS

Photograph of Sony PlayStation II System.
Photograph of Sega Dreamcast System.
Photographo of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.

(List continued on next page.)

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Cartoon lighting and other non-photorealistic effects can be produced by using a lighting calculation to produce a parameter other than color or opacity for use in a later modification of a color or opacity value. In more detail, the example embodiment uses the lighting calculation to generate texture coordinates used in a texture mapping operation. The texture mapping operation allows lighting computation results to select between brush strokes for cartoon lighting and other effects. The resulting dynamic cartoon lighting animation can be performed on a low cost platform such as a home video game system or personal computer.

22 Claims, 24 Drawing Sheets

(1 of 24 Drawing Sheet(s) Filed in Color)

EXAMPLE IMAGE GENERATING PROCESS

U.S. PATENT DOCUMENTS

| | | | |
|---|---|---|---|
| 5,421,028 A | | 5/1995 | Swanson |
| 5,457,775 A | | 10/1995 | Johnson, Jr. et al. |
| 5,467,438 A | | 11/1995 | Nishio et al. |
| 5,473,736 A | | 12/1995 | Young |
| 5,495,563 A | * | 2/1996 | Winser ..................... 345/582 |
| 5,504,499 A | | 4/1996 | Horie et al. |
| 5,504,917 A | | 4/1996 | Austin |
| 5,557,712 A | | 9/1996 | Guay |
| 5,566,285 A | | 10/1996 | Okada |
| 5,594,854 A | | 1/1997 | Baldwin et al. |
| 5,606,650 A | | 2/1997 | Kelley et al. |
| 5,608,424 A | | 3/1997 | Takahashi et al. |
| 5,649,082 A | | 7/1997 | Burns |
| 5,687,304 A | * | 11/1997 | Kiss ......................... 345/419 |
| 5,687,357 A | | 11/1997 | Priem |
| 5,701,444 A | | 12/1997 | Baldwin |
| 5,721,947 A | | 2/1998 | Priem et al. |
| 5,727,192 A | | 3/1998 | Baldwin |
| 5,740,343 A | | 4/1998 | Tarolli et al. |
| 5,758,182 A | | 5/1998 | Rosenthal et al. |
| 5,764,243 A | | 6/1998 | Baldwin |
| 5,768,626 A | | 6/1998 | Munson et al. |
| 5,768,629 A | | 6/1998 | Wise et al. |
| 5,774,133 A | | 6/1998 | Neave et al. |
| 5,777,629 A | | 7/1998 | Baldwin |
| 5,798,770 A | | 8/1998 | Baldwin |
| 5,801,706 A | | 9/1998 | Fujita et al. |
| 5,801,716 A | | 9/1998 | Silverbrook |
| 5,805,868 A | | 9/1998 | Murphy |
| 5,815,166 A | | 9/1998 | Baldwin |
| 5,821,949 A | | 10/1998 | Deering |
| 5,874,969 A | | 2/1999 | Storm et al. |
| 5,917,496 A | | 6/1999 | Fujita et al. |
| 5,920,326 A | | 7/1999 | Rentschler et al. |
| 5,940,086 A | | 8/1999 | Rentschler et al. |
| 5,943,058 A | | 8/1999 | Nagy |
| 5,949,424 A | | 9/1999 | Cabral et al. |
| 5,949,440 A | | 9/1999 | Krech, Jr. et al. |
| 5,956,042 A | * | 9/1999 | Tucker et al. ............... 345/426 |
| 5,969,726 A | | 10/1999 | Rentschler et al. |
| 5,999,196 A | | 12/1999 | Storm et al. |
| 6,002,409 A | | 12/1999 | Harkin |
| 6,023,261 A | | 2/2000 | Ugajin |
| 6,023,738 A | | 2/2000 | Priem et al. |
| 6,025,853 A | | 2/2000 | Baldwin |
| 6,028,611 A | | 2/2000 | Anderson et al. |
| 6,037,949 A | | 3/2000 | DeRose et al. |
| 6,057,852 A | | 5/2000 | Krech, Jr. |
| 6,092,124 A | | 7/2000 | Priem et al. |
| 6,173,367 B1 | | 1/2001 | Aleksic et al. |
| 6,181,352 B1 | | 1/2001 | Kirk et al. |
| 6,198,488 B1 | * | 3/2001 | Lindholm et al. .......... 345/426 |
| 6,226,012 B1 | | 5/2001 | Priem et al. |
| 6,232,981 B1 | * | 5/2001 | Gossett ...................... 345/582 |
| 6,239,810 B1 | * | 5/2001 | Van Hook et al. .......... 345/420 |
| 6,417,858 B1 | * | 7/2002 | Bosch et al. ................ 345/522 |

FOREIGN PATENT DOCUMENTS

| | | |
|---|---|---|
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper:Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into Wholly–Owned Subsidiaries", Mar. 9, 1999.
AM News: Japanese Developers Not All Sold on PS2, Next Generation, Mar. 16, 1999.

Sony To Turn PlayStation Maker Into Wholly Owned Unit–Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Mag DDR OEM, Aug. 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov. 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1878).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000, www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com Technical Presentation: GeForce 256 and RIVA TNT Combiners, Dec. 8, 1999, www.nvidia.com.

Technical Presentation: Vertex Cache Optimization, Nov. 12, 1999, www.nvidia.com Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999, www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999, www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, Feb. 1999, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addison–Wesley Publishing Co., 1993.

"Procedural Elements for Computer Graphics," Second Edition, David F. Rogers, McGraw–Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

White Paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending," (Dec. 16, 1999).

* cited by examiner

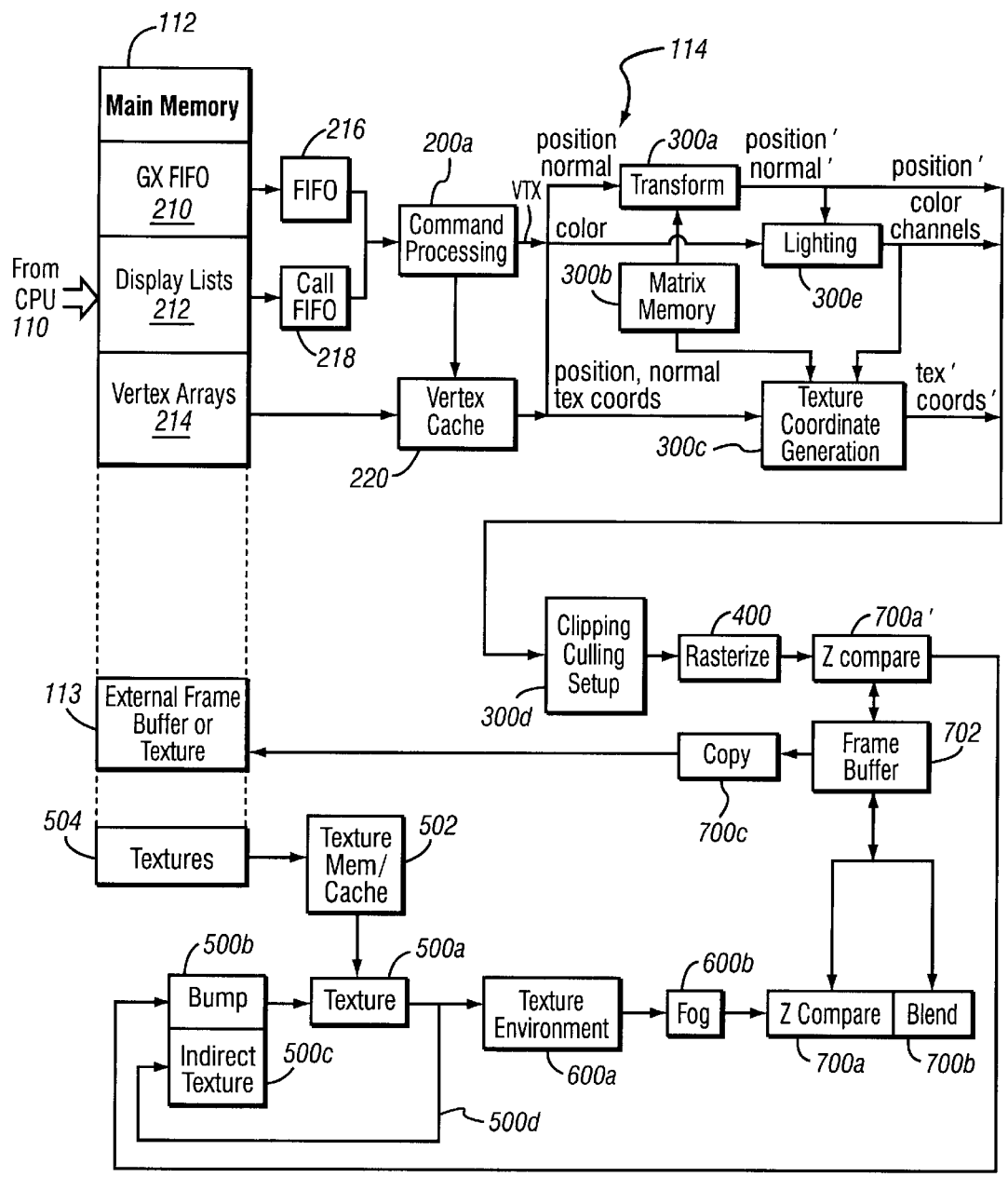
Fig. 5   EXAMPLE GRAPHICS PROCESSOR FLOW

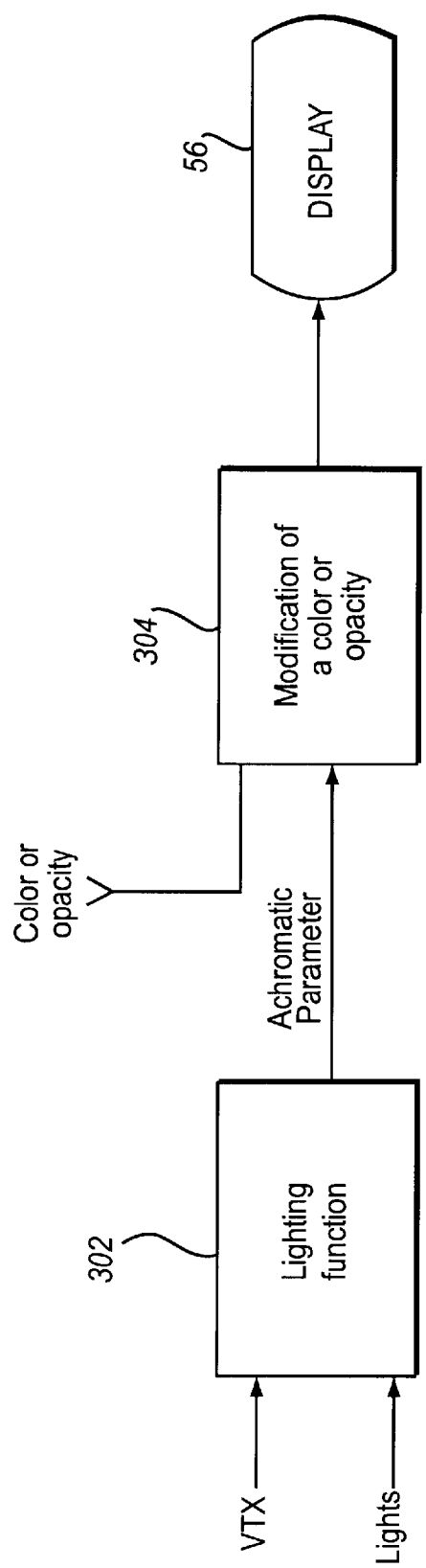
Fig. 6  EXAMPLE IMAGE GENERATING PROCESS

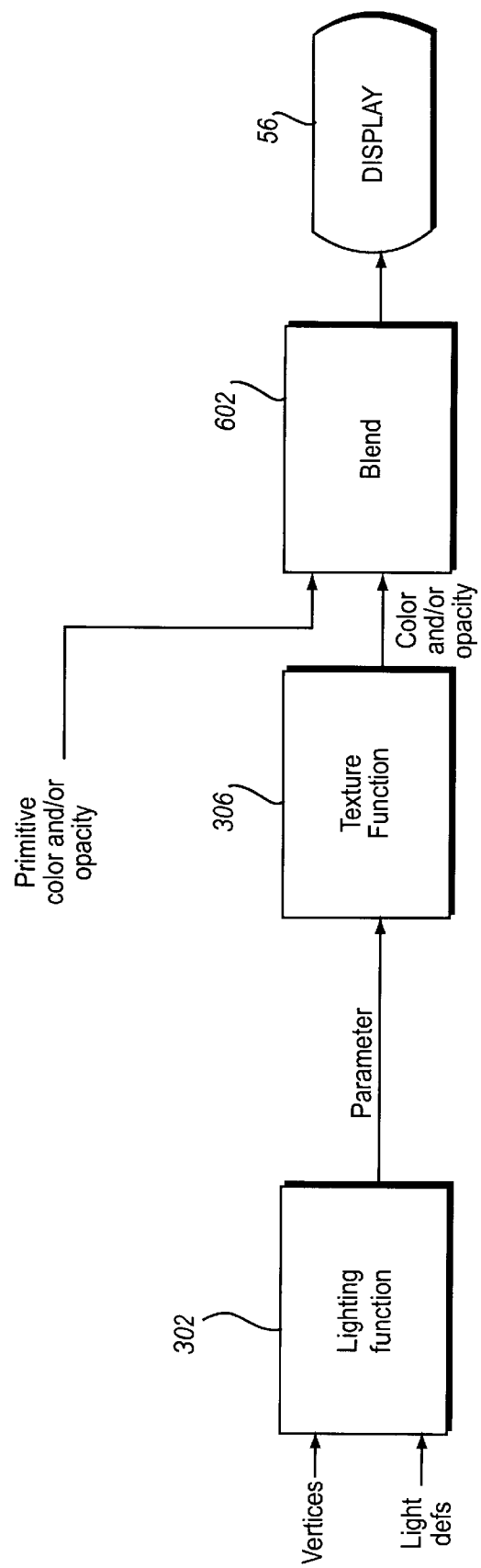
Fig. 7  EXAMPLE TEXTURING PROCESS BASED ON ACHROMATIC LIGHTING PARAMETER

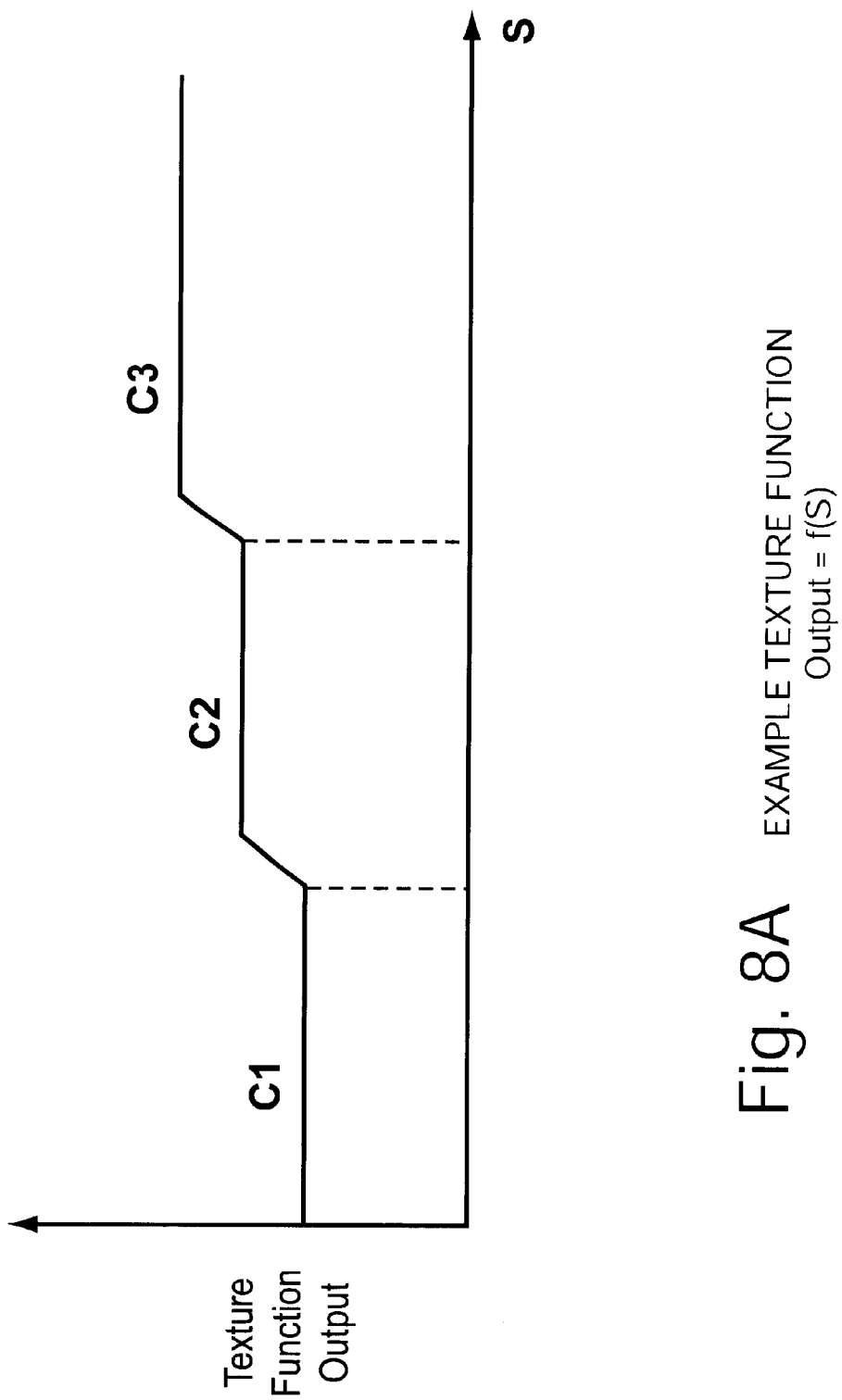
Fig. 8A  EXAMPLE TEXTURE FUNCTION
Output = f(S)

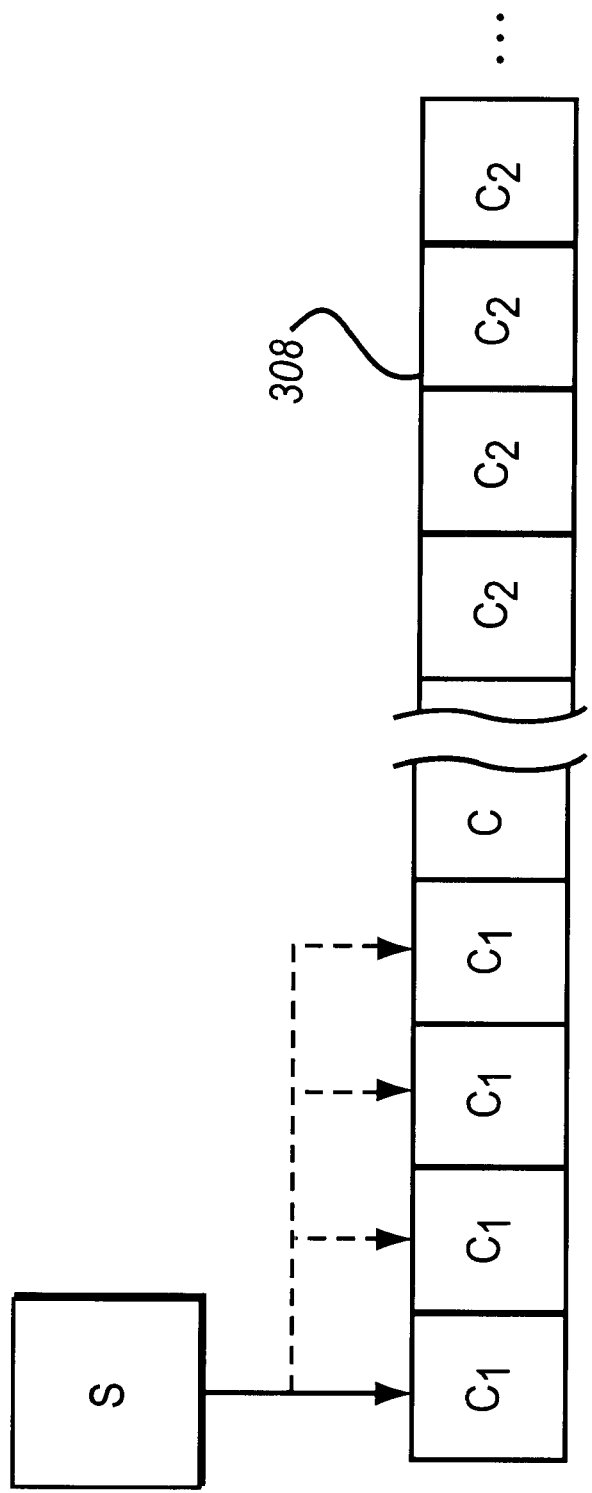
Fig. 8B  EXAMPLE 1-D TEXTURE MAPPING

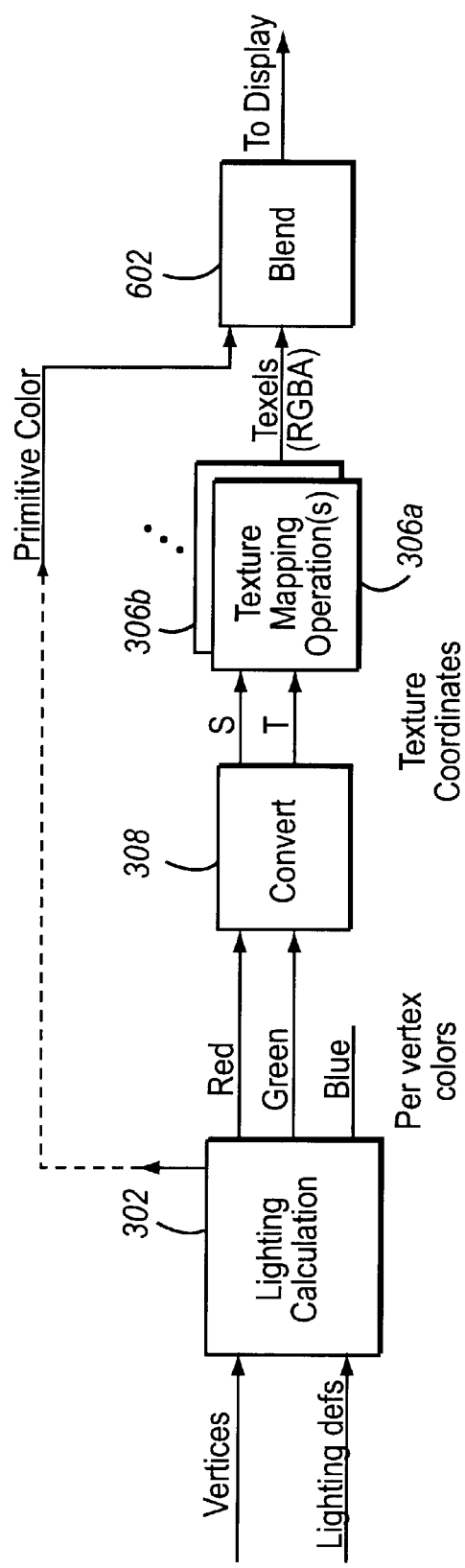
Fig. 9 EXAMPLE TEXTURE MAPPING

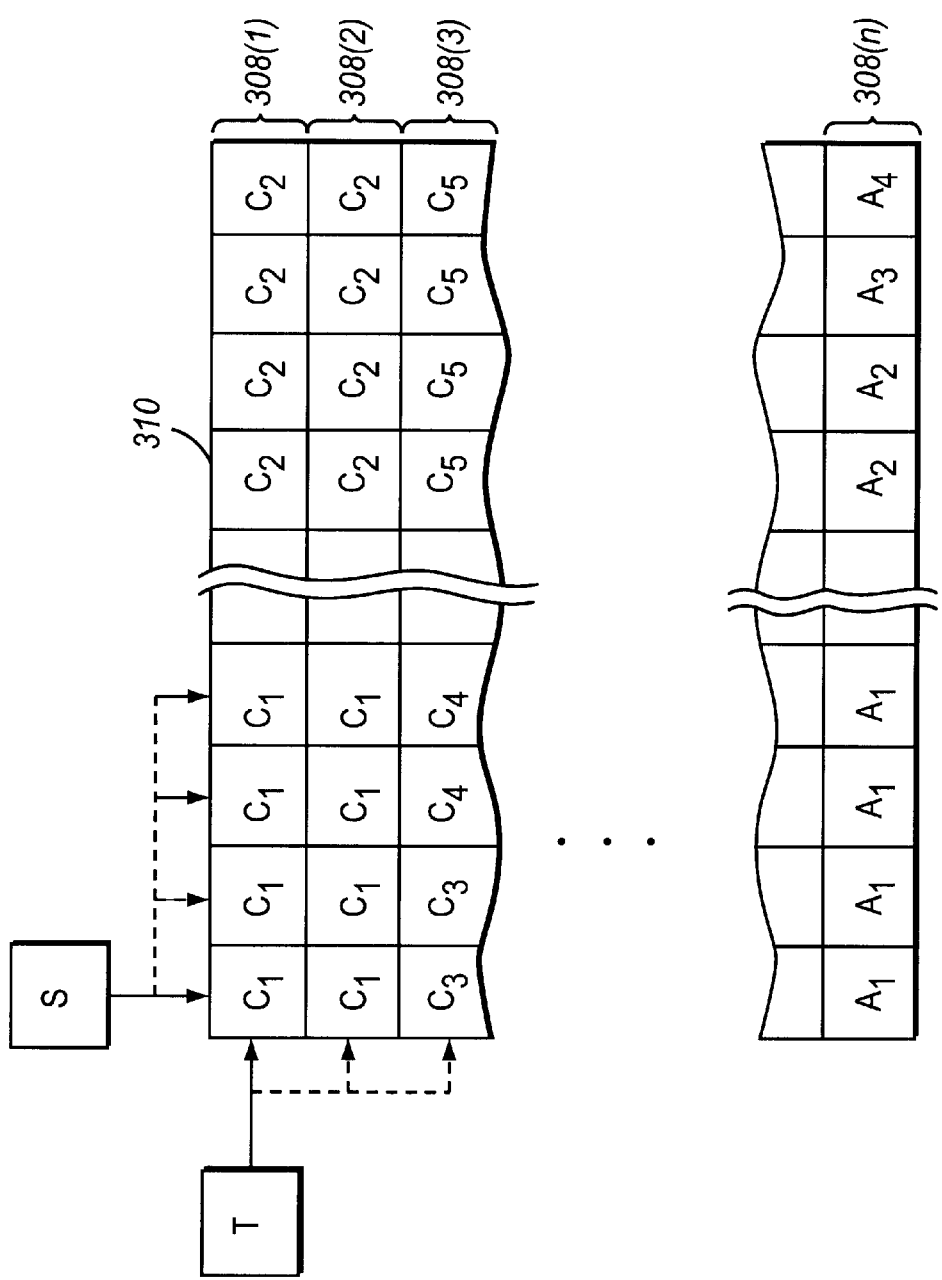
Fig. 10A EXAMPLE 2-D TEXTURE MAPPING

EXAMPLE 2D TEXTURE

EXAMPLE LIGHTING PIPELINE IMPLEMENTATION

ASSOCIATING LIGHTS WITH COLOR CHANNELS

EXAMPLE TRANSFORM UNIT IMPLEMENTATION

Example Lighting Pipeline Implementation

Example Vector Dot/Add
Unit Implementation

Example Normalize
Implementation

Example Distance Attenuator Implementation

Example Light Scaler Implementation

Fig. 19 EXAMPLE INTEGER ACCUMULATOR IMPLEMENTATION

Example State Transition Diagram

ACHROMATIC LIGHTING IN A GRAPHICS SYSTEM AND METHOD

This application claims the benefit of U.S. Provisional Application No. 60/227,007, filed Aug. 23, 2000, the entire content of which is hereby incorporated by reference in this application.

FIELD OF THE INVENTION

The present invention relates to computer graphics, and more particularly to interactive graphics systems such as home video game platforms. More particularly, this invention relates to a graphics processing improvement that uses a lighting function to produce a parameter for subsequent use in changing a color or opacity. Still more particularly, the invention relates to a 3D graphics system wherein a lighting calculation defines a parameter such as distance or angle that is applied to a further function (e.g., texturing).

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

It has long been known to perform lighting calculations in a 3-D graphics systems based on a variety of parameters (e.g., distance attenuation, angle, beam lighting, etc.). Traditionally, the results of such lighting calculations were used to modify the color and/or opacity of the object being displayed—as is documented in a variety of standard reference materials on computer graphics (see for example, Foley et al, *Computer Graphics Principles and Practice* (2d. Ed. 1990) at Chapter 16 ("Illumination and Shading"); and Moller et al, *Real Time Rendering* (A K Peters 1999) at Section 4.3 et seq. ("Lighting and Shading"); Rogers et al, *Procedural Elements for Computer Graphics* (2d Ed. McGraw-Hill 1997) at Section 5.2 et. seq. ("Illumination Models"); Neider et al, *OpenGL Programming Guide* (Addison-Wesley 1993) at Chapter 6 ("Lighting"); and Kovach, *Inside Direct3D* (Microsoft Press 2000) at Chapter 5 ("Direct3D Vertices and the Transformation and Lighting Pipeline"). For example, techniques known as Gouraud shading and Phong shading modify the color of a displayed surface depending on a lighting effect modeled by a lighting equation. As one example, shining a bright spotlight on a shiny surface can have the effect of whitening the surface color at points where the light is shining. This is often accomplished in a conventional graphics system by having the rasterizer determine the color of each pixel of the displayed surface of a primitive based on the primitive's color (often defined on a vertex-by-vertex basis) and on the result of the lighting equation(s).

A problem graphics system designers confronted in the past was how to efficiently create non-photorealistic images such as cartoon characters. For many years, most of the work in the graphics field was devoted to creating images that are as realistic as photographs. More recently, however, there has been an interest in non-photorealistic imaging.

One type of non-photorealistic imaging that has recently generated interest is the process of automating the imaging of cartoon characters. During the heyday of hand drawn cartooning in the 1930s and 1940s, artists created wonderful cartoon characters that dynamically changed from frame to frame. These hand drawn cartoons in many ways set the standard for cartoon rendering. The cartoons were not intended to appear realistic. To the contrary, the cartoons were designed to appear as caricatures. For example, in such cartoons, a person's face might appear to be pasty white with rosy red cheeks defined by brilliantly red or reddish-pink coloration. As the character moved through the scene, the cheek coloration might change dynamically as the artist hand-colored each frame. Such dynamic effects are fascinating to watch and add interest to the cartoon images.

Unfortunately, the hand-drawn cartoon artistry of the 1930s and 1940s was very time consuming and expensive. Moreover, people now want to use video and computer games to interact with cartoon characters. While video games have for a number of years been successful in dynamically rendering cartoon characters interactively, they have never achieved the hand-drawn artistry details of latter-day hand-drawn cartoons. While much work has been done on high end type systems for authoring cartoon and other non-photorealistic images, further improvements are possible and desirable.

The present invention provides improvements in non-photorealistic and other imaging effects that can be implemented using a low cost graphics system such as, for example, a home video game platform or a personal computer graphics accelerator.

In accordance with one aspect provided by this invention, the lighting function of the type typically used to light objects within a scene is used to produce a parameter other than color. Such a parameter is used to modify a color or opacity of an object.

In accordance with another aspect provided by this invention, a lighting calculation performs per-vertex lighting to provide conventional color component outputs. The color component outputs are applied to a texturing function that processes the color components as achromatic parameters. The texturing function output provides a visualization effect (e.g., color and/or opacity modified based on the achromatic parameters) that is used to contribute to the visualization of a rendered scene.

In accordance with yet another aspect provided by this invention, the lighting calculation output provides three color components one of which is discarded. The other two color components are converted into texture coordinates and used in a texture mapping operation. One of the texture coordinates selects a one-dimensional texture map within a two-dimensional table. The other texture coordinate selects a particular texel within the selected one-dimensional texture map. The resulting selected texel provides color and/or alpha information that is applied to a surface defined by the vertex.

In accordance with yet another aspect provided by this invention, non-photorealistic cartoon lighting effects are provided in a real time 3D graphics system by using a lighting calculation to produce a parameter other than color or opacity. A one-dimensional texture map can be defined specifying different brush strokes as a function of the parameter. A conventional texture mapping operation can be used to map the one-dimensional texture map onto a polygon surface based on the parameter.

In more detail, the disclosed system can provide conventional lighting-based shading (as discussed above) as part of its overall operation, but provides an additional enhancement that allows the lighting equation(s) to generate a texture coordinate (i.e., a parameter other than color or opacity). That other parameter may be inputted to a further function (e.g., a lookup table stored as a texture) to provide a further result—which may in turn change the color/opacity of an object. This intermediate step of, having the lighting calculation produce a parameter that only indirectly affects color and/or opacity of a displayed object provides additional flexibility beyond conventional approaches that use the lighting equation output to directly affect primitive surface color.

A particular example embodiment uses the lighting equation result to select a one-dimensional texture from a number of textures. As an example, to display a tree trunk you might define two different one-dimensional textures—one having a range of silvers and the other having a range of browns. The lighting equation could be used to determine the angle at which a light source is striking the tree trunk, with the result selecting between the two textures. The tree trunk could be colored (using conventional texture mapping) with a range of different silvers from an oblique angle but with a range of browns/blacks when the light is striking it head-on. In such a case, the lighting equation selects a one-dimensional texture (i.e., it is acting as a parameter other than color or opacity—in this particular example, selecting between two different textures).

In the particular embodiment disclosed herein, improvements are made to the transformation and lighting ("T & L") pipeline to allow it to generate a texture coordinate(s) based on the lighting equation. The transformation and lighting develops the lighting equation output, but instead of providing it directly to change the pixel color/opacity generated by the rasterizer, it provides the result as a texture coordinate to a texture unit. In the disclosed embodiment, the output of the texture unit is a color or opacity that is blended with the object's primitive color/opacity (e.g., as developed by transform and lighting pipeline and the rasterizer in a conventional fashion based on the same or different lighting equation using a conventional shading algorithm such as Gouraud or Phong shading) to provide a modified color/opacity value for display.

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings are briefly described as follows:

FIG. 5 is an example logical flow diagram of the FIG. 4 graphics and audio processor;

FIG. 6 shows an example high-level image generating process provided by this invention;

FIG. 7 shows a more specific image generating process provided by this invention that uses texturing based on an achromatic lighting parameter;

FIG. 8A shows an example texture function;

FIG. 8B shows an example one-dimensional texture map;

FIG. 9 shows an example texture mapping procedure;

FIG. 10A shows an example two-dimensional texture map;

DETAILED DESCRIPTION OF EXAMPLE EMBODIMENTS OF THE INVENTION

Figure 1:
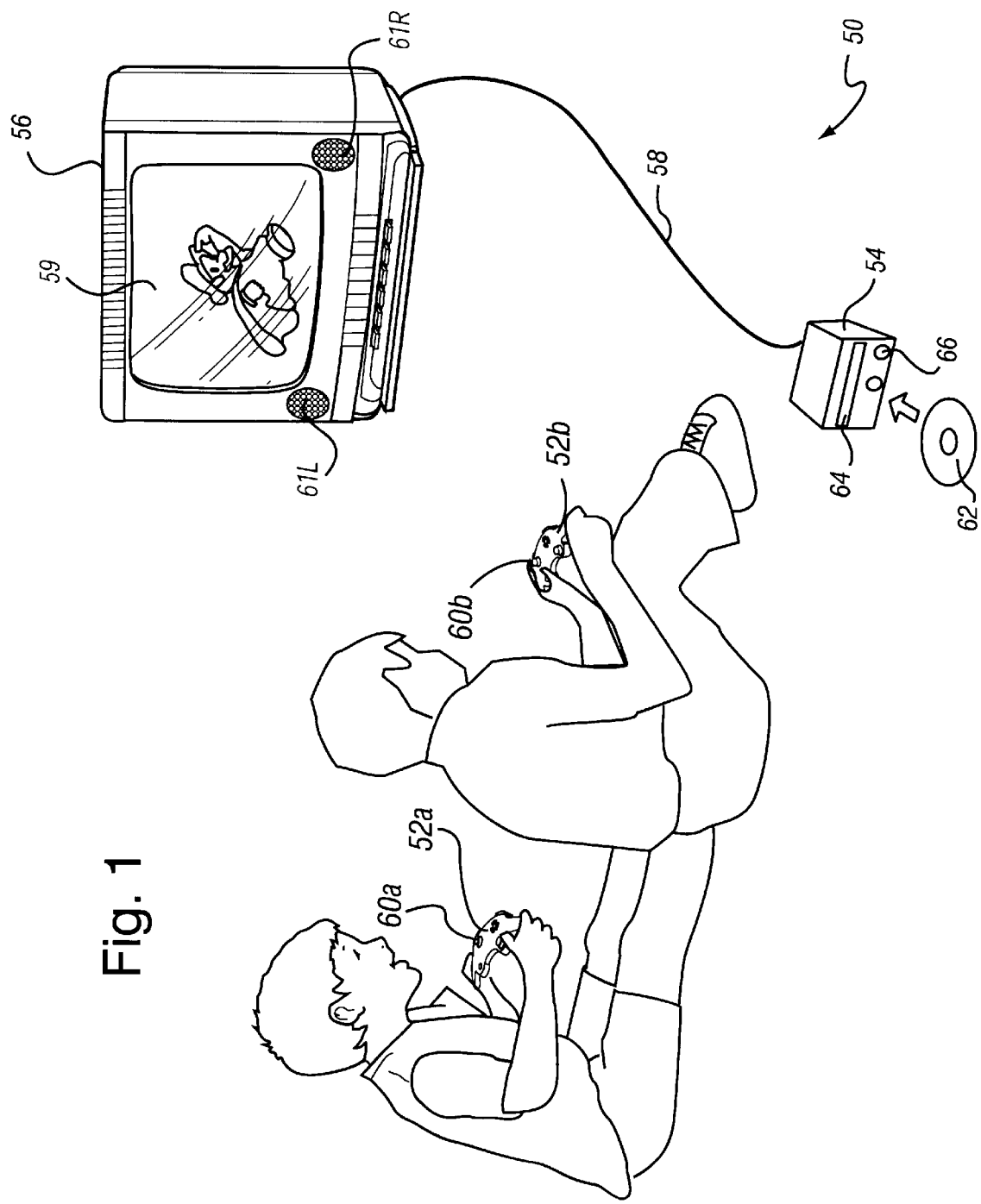
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

EXAMPLE ELECTRONICS OF OVERALL SYSTEM

Figure 2:
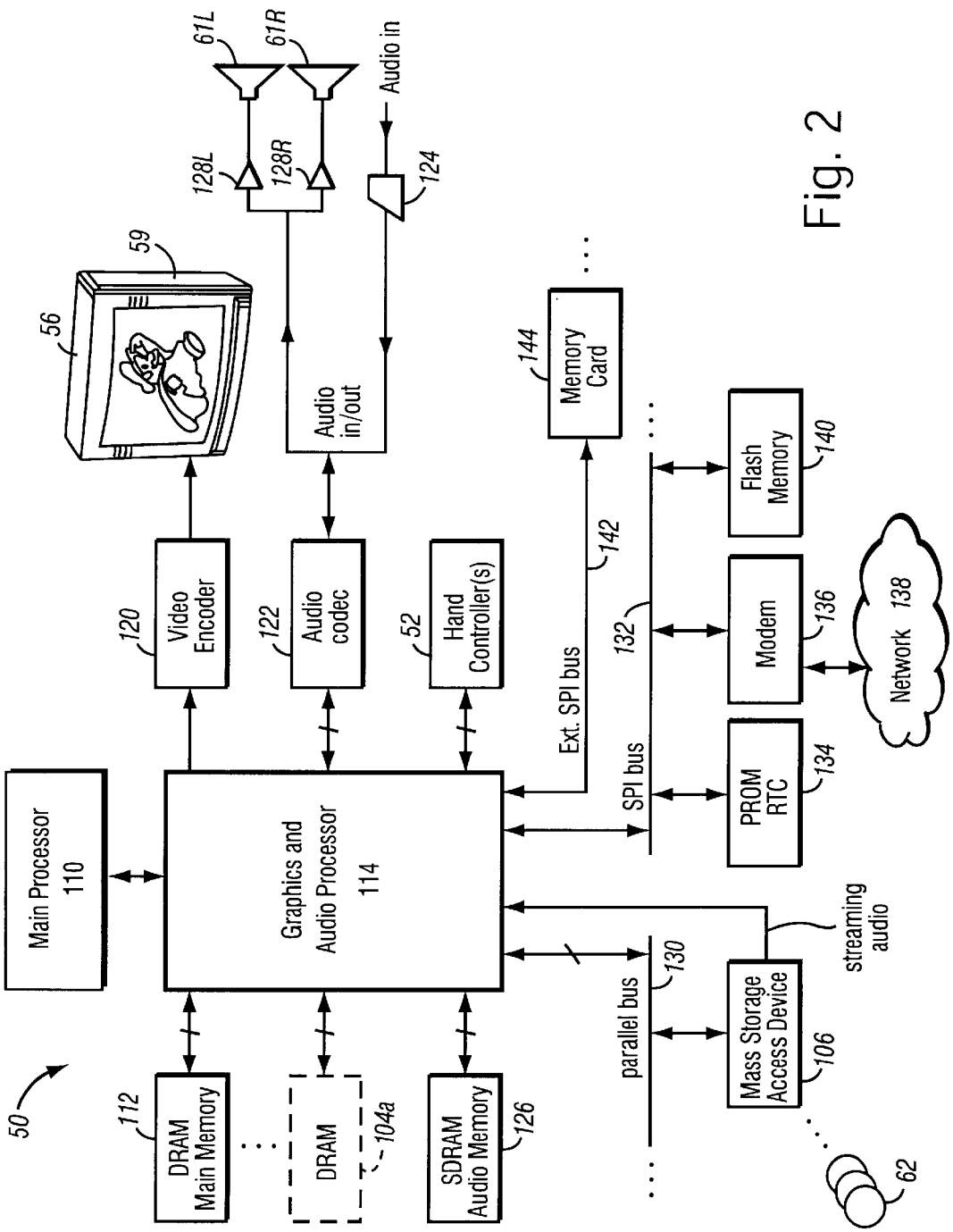
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

EXAMPLE GRAPHICS AND AUDIO PROCESSOR

Figure 3:
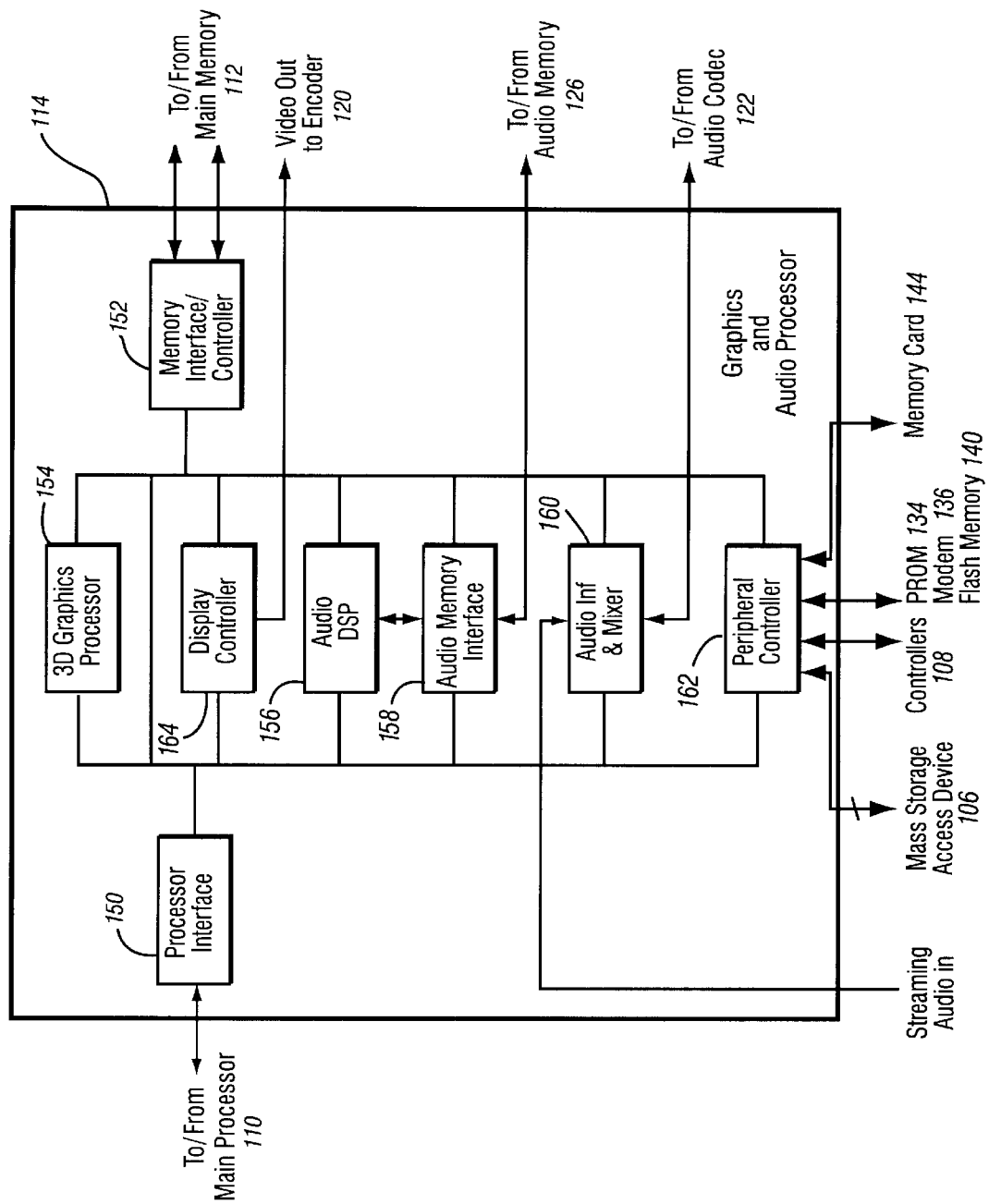
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

EXAMPLE GRAPHICS PIPELINE

Figure 4:
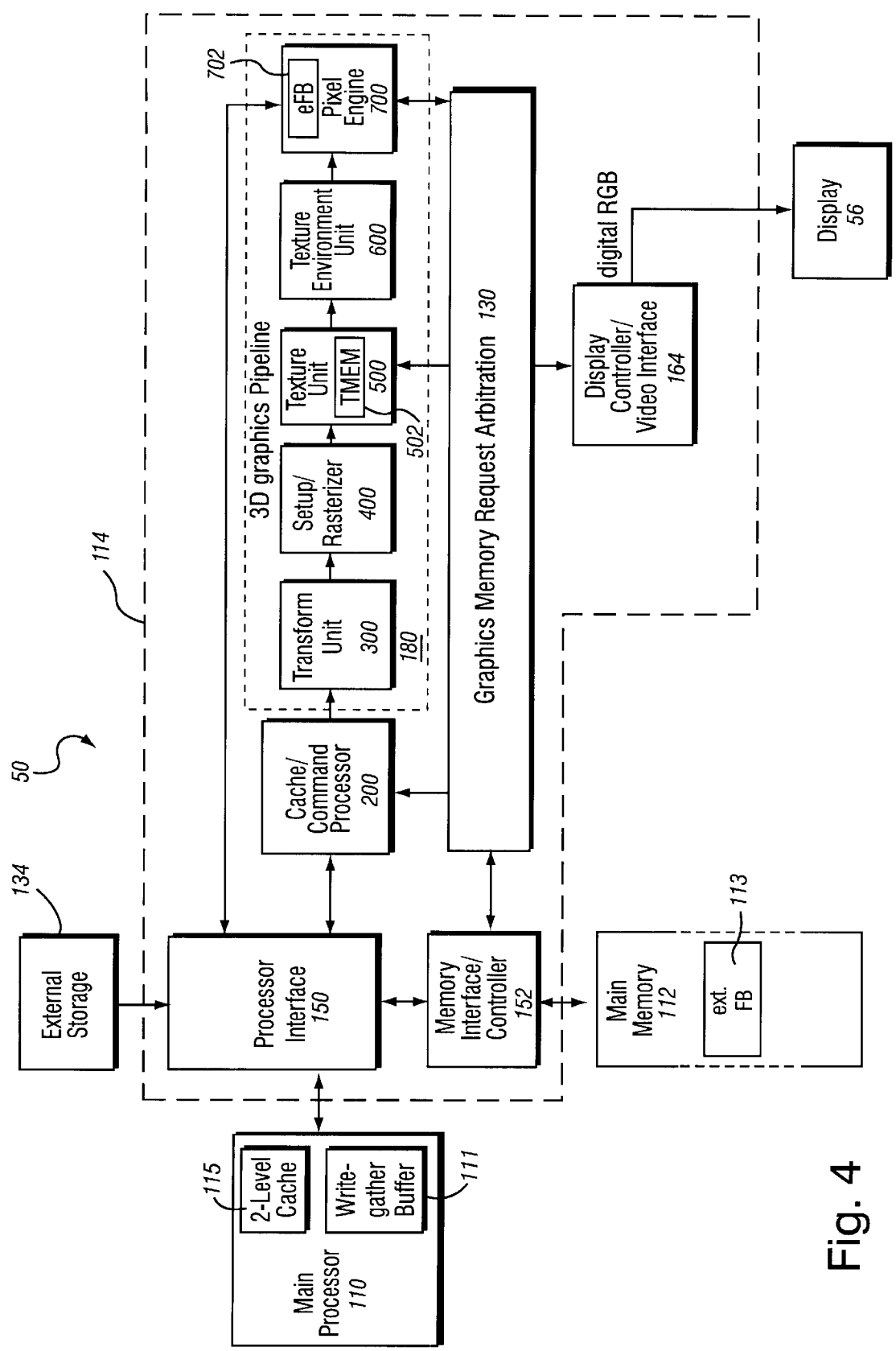
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Antialiasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Achromatic Lighting Function

As discussed above, transform unit 300 in the example embodiment performs lighting in addition to geometric transformations, clipping, culling and other functions. In the example embodiment, transform unit 300 supports lighting in hardware as a per-vertex calculation. This means that a color (RGB) value can be computed for every lit vertex, and that these colors can be linearly interpolated over the surface of each lit triangle. This is known as Gouraud shading. Additional details concerning an example lighting implementation are discussed below in connection with FIGS. 12 and following.

The example embodiment transform unit 300 provides an additional use for lighting function(s) 302 not available in traditional graphics systems. Generally, the output of the lighting function in the traditional graphics system is a color used for polygon shading. Some graphics systems provide an alpha (e.g., transparency) value based on a lighting function. In the example embodiment provided by the present invention, a lighting function is used to provide an achromatic parameter (i.e., neither color nor alpha, but something else) used to subsequently modify a color and/or opacity.

FIG. 6 is a block diagram showing such an arrangement where lighting function 302 provides an achromatic parameter used by a subsequent process 304 to modify a color or opacity. The results of the modification are displayed on a display device such as display 56. In this context, the term "lighting function" generally means a mathematical function of a surface position, a surface orientation, an eye location and, in some cases, a light location. Lighting functions can be defined as any combination of these coordinates.

In the example embodiment, the achromatic parameter outputted by lighting function 302 is processed by a texturing function 306 as shown in FIG. 7. At a very simple level, texturing an object means "glueing" an image onto that object. In more detail, texturing generally works by modifying the values used in lighting function 302. For example, in the typical case, a lighting function 302 is used to determine the color and illumination of a polygon surface, and a texturing function is used to modify that color/ illumination to provide an additional effect (e.g., to create the appearance of a brick wall or a wood-grain, to make the surface appear bumpy, mirrored or warped, etc.). In the example embodiment shown in FIG. 7, in contrast, the output of lighting function 302 is not a color or transparency value, but is instead a generalized parameter (for example, a texture coordinate) for texturing function 306. The texturing function develops color and/or opacity information used to modify (e.g., blend) with a primitive color and/or opacity for display on display device 56.

FIG. 8A shows an example texture function 306. In this example, the lighting function 302 produces an achromatic output parameter S that parameterizes the example texture function 306. In this FIG. 8A example, the example texture function 306 selects one of three colors (C1, C2, C3) or opacities depending upon the value of parameter S. Thus, the particular color or opacity outputted by texture function 306 is determined as a function of the parameter S outputted by lighting function 302. Because lighting function 302 is providing parameter S, the selection of which color or opacity outputted by texture function 306 can depend on any of various factors used by the lighting function calculation, including for example:

distance, attenuation, angle, vector, cosine, polynomial, light source type, other coefficient.

While texture function 306 may be implemented in a variety of different ways, a cost-effective approach is to store the texture function 306 output values in a texture lookup table or map and to access those values using texture coordinates. FIG. 8B shows an example one-dimensional texture map 308 indexed by lighting function 302 output parameter S. An advantage of using a conventional texture mapping function in the example embodiment is that texture mapping hardware or other functionality available for general purpose texturing can also be used to implement texture function 306 in cooperation with lighting function 302.

FIG. 9 shows a more detailed example including a two-dimensional texture mapping operation 306. In this example, a lighting calculation 302 is performed based on an identification of vertices and lighting definitions. The output of lighting calculation 302 in the example embodiment comprises per-vertex colors (e.g., red, green, blue) and/or transparency (i.e., alpha). The example embodiment typically uses these lighting calculation 302 color outputs for Gouraud shading of a polygon surface. However, in this mode of operation, one of the color channels (e.g., blue) is discarded, and the other two color channels (i.e., red, green) are converted into texture coordinates s, t using a conversion operation 308. The texture coordinates s, t are applied to one or more texture mapping operations 306a, 306b, etc. to provide color/transparency output texels. Blending operation 602 may blend these texels with surface color information (which may be derived using conventional shading techniques based on the same or different lighting calculation) to provide shaded, textured polygons for display.

In the example embodiment, texture mapping operation 306 provides two-dimensional texture mapping as shown in FIG. 10A. In this example, the t texture coordinate is generated based on the green color channel output of lighting calculation 302, and is used to select one of n one-dimensional texture maps within a two-dimensional texture map 310. The other texture coordinate s is developed based on the red color channel output of lighting calculation 302, and is used to select a particular texel within the one-dimensional texture selected by the t coordinate. Of course, the s texture coordinate could select the 1-D map and the t texture coordinate could select a particular texel in other implementations, and/or different colors and/or opacities could be used to generate the different texture coordinates. Three texture coordinates could be used to select texels in a 3D texture if desired.

Figure 10B:
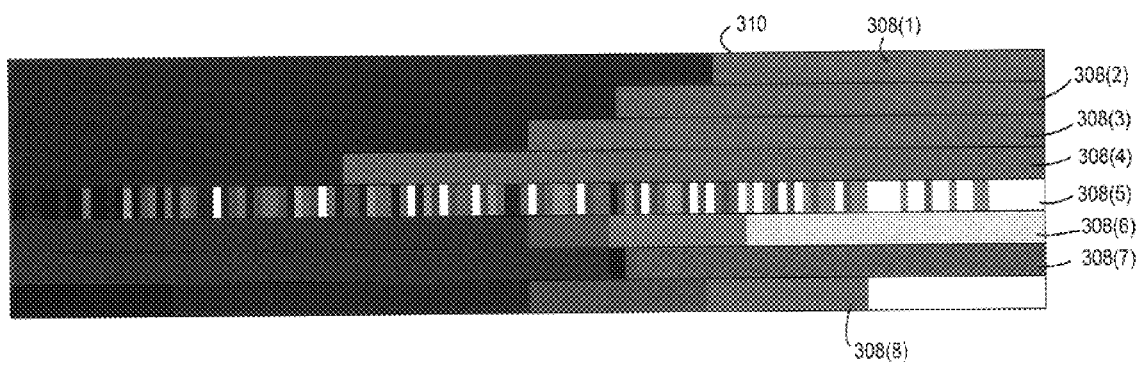
FIG. 10B shows a further example two-dimensional texture map.

FIG. 10B is an illustrative example of a two-dimensional texture map 310 comprising a number of one-dimensional texture maps 308. The particular two-dimensional texture map shown in FIG. 10B is particularly suitable for cartoon lighting effects. The example shown includes a number of one-dimensional texture maps including four maps 308(1) . . . 308(4) each comprising two different kinds of texels (e.g., purple texels and blue texels). One of the texture coordinates (e.g., t) selects between these different texture maps and the other texture coordinate (e.g., s) selects a particular texel (i.e., blue or purple). The various 1D texture maps 308(1) . . . 308(4) provide different mappings between the texture coordinates and blue or purple texels to provide different brush strokes or other effects.

As another example, the 1D texture map 308(6) shown in FIG. 10B includes four different types of texels (yellow, orange, red and brown). These different colors could be used to provide bold cartoon-like lighting effects where, for example, the angle a directional light makes with an object or the distance of an object from a light source determines the color resulting from the output of texture mapping operation 306. Such visualization can have a variety of interesting applications—especially in non-photorealistic real time rendering such as dynamically-generated cartoon animation. For example, it is possible to define a virtual cartoon light which lights up an object. The object's rendered visualization becomes dependent on vertex position, the local cartoon light position and other factors the lighting calculation 302 takes into account (e.g., specular or diffuse computation, distance attenuation, etc.). In one example, it is possible to set the red color channel to zero and allow the lighting calculation 302 to compute the green channel to specify a particular texel value within a 1D texture defining a set of brush strokes. The material color main processor 110 typically can apply to lighting calculation 302 can be used to specify which 1D texture to select within a 2D texture map. Lighting calculation 302 calculates which brush stroke to select on a vertex-by-vertex basis at no extra cost beyond supplying one index per vertex.

While the example shown in FIG. 9 is particularly useful for cartoon lighting, it can also be used for many other applications. As one example, lighting function 302 can be used to calculate a shadow volume or surface. Lighting calculation 302 based on a given vertex could generate a shadow volume defined at texture coordinates used for the texture mapping operation 306. Many other applications are possible. For example, one interesting application relates to projective textures. An undesirable property of projective textures is that they typically project forward and backward from the camera. The techniques disclosed herein can provide projective texture coordinate generation based on a lighting function which provides attenuation (e.g., to eliminate backwards facing lighting) and/or distance attenuation (e.g., to attenuate the projective texture based on how far it is projected—just as you might see when using a real slide projector to project an image. Such projective texturing in combination with the achromatic lighting function described herein can produce many interesting images and imaging effects.

A conversion operation 306 as shown in FIG. 9 may not be necessary in all implementations. In the example embodiment, lighting calculation 302 generates an integer output that conversion block 308 converts into a floating point representation suitable for texture coordinates used in the following texture mapping operation 306. However, such integer-to-floating point conversion would not be necessary in other implementations, or other implementations could use different types of conversions as desired.

In the example embodiment shown in FIG. 9, lighting calculation 302 need not calculate both s and t texture coordinates. Since only one texture coordinate is used as a parameter in the example embodiment to select which particular texel was in a one-dimensional texture map should be applied to a primitive surface, the preferred embodiment preferably calculates that texture coordinate (or in intermediate value from which that texture coordinate is derived) using lighting calculation 302. However, depending on the application, it might be desirable for the application program as opposed to lighting calculation 302 to specify another texture coordinate used to select (in this example embodiment) between plural one-dimensional textures 308. As one example, the application program running on main processor 110 can specify a value for any or all of the color channel outputs of lighting calculation 302 via the lighting definitions applied to the lighting calculation input. In some applications, it may be desirable for the main processor 110 to specify the contents of, for example, the green color channel and thus the particular one-dimensional texture used in the texture mapping operation 306. This provides additional application programmer control while still allowing the lighting calculation 302 to dynamically generate the s texture coordinate based on the variables lighting calculation unit 302 evaluates. Floating point values the main processor 110 sends to transform unit 300 can be truncated to RGB8 to allow calculations to occur in higher precision.

In the example embodiment, there is no reason why lighting calculation 302 cannot produce a negative output value. In the example shown in FIG. 9, this corresponds to backlighting an object. Thus, it is possible to have negative or backlit cartoon lighting in the example embodiment. This could be useful to provide effects where there is information on the backside of an object. In the preferred embodiment, the lighting unit always outputs a positive color (value). The preferred embodiment supports a negative type of lighting calculation, but it up to the application to add a scale and/or a bias so that the final value ends up being positive. For example, the output of the lighting calculation could be mapped from −1 to 0 and from +1 to 1 before being converted to a texture coordinate(s). The example embodiment does not clamp negative values, but simply maps them into positive numerical values—with the application being careful to ensure that these positive values are interpreted appropriately. Of course, other implementations could support negative lighting values directly if desired.

Texture mapping operation 306 and blending operation 602 shown in FIG. 9 can be arbitrarily complex. For example, it is possible to blend with alpha. As another example, it will be possible to use two separate color channels outputted by lighting calculation 302 for two different texture mapping operations which could then be blended together by blender 602. Since texture mapper 500 and texture environment unit 600 in the example embodiment are both multi-task/multi-stage operations, a sequence of direct/indirect operations can be provided based on the output of lighting calculation 302 to provide a variety of interesting and complicated effects. See, for example, commonly assigned copending provisional application No. 60/226,891, filed Aug. 23, 2000 and its corresponding utility application No. 09/722,382, filed Nov. 28, 2000, both entitled "Method And Apparatus For Direct And Indirect Texture Processing In A Graphics System", and commonly assigned copending provisional application No. 60/226,888, filed Aug. 23, 2000 and its corresponding utility application No. 09/722,367, filed Nov. 28, 2000, both entitled "Recirculating Shade Tree Blender For A Graphics System", all of which are incorporated by reference herein.

Example Lighting Pipeline Implementation

Figure 11:
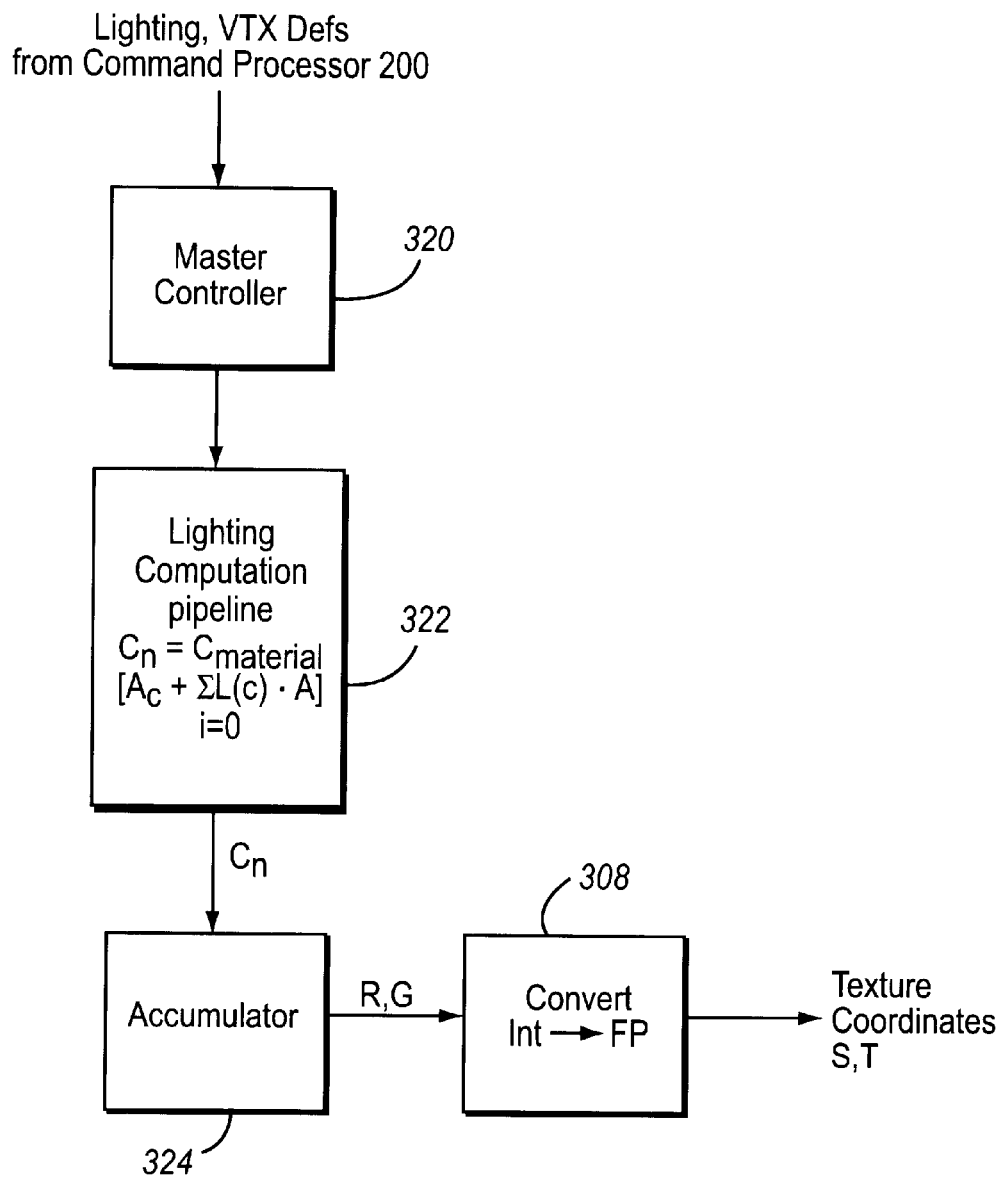
FIG. 11 shows an example lighting pipeline implementation.

FIG. 11 shows an example block diagram of lighting calculation 302. In this example, lighting calculation 302 is performed by transform unit 300 in response to information received from command processor 200. This information can come from a variety of sources including main processor 110 and main memory 112 (see FIG. 4).

In the example embodiment, the transform unit 300 includes a master control section 320, a lighting computation pipeline 322, an accumulator 324 and—for purposes of texture generation, an integer-to-floating point converter 308. Master controller 320 receives lighting definitions and vertex definitions from command processor 200 and, after appropriate storage/buffering, provides associated information to the lighting computation pipeline 322. Lighting pipeline 322 performs a lighting computation in the following basic form:

$$C_n = C_{material}\left[A_c + \sum_{i=0} L(c) \cdot A\right]$$

where $C_n$ defines the output of the lighting calculation pipeline, $C_{material}$ defines the material color, $A_c$ defines the ambient color, $L(c)$ defines the lighting diffuse or specular component, and A defines distance attenuation. This calculation computes an RGB triplet since the example embodiment lighting calculation pipeline 322 can perform two such lighting calculations in parallel. Because of this parallel computation feature, one of the lighting computations can be used for achromatic lighting effects for an object and the other lighting computation can be used for chromatic lighting effects on the same object. The parallel computation feature makes effects such as cartoon lighting "free" in the sense that it takes no more processing time to generate a shaded polygon surface with cartoon lighting effects than it does to generate the shaded polygon surface without such cartoon lighting effects. In the example embodiment, the $C_n$ value generated by lighting computation pipeline 322 can be positive or negative—with negative lighting allowing backlit and other interesting effects.

In the example embodiment, a $C_n$ output of lighting computation pipeline 322 is accumulated by a integer accumulator 324. The accumulated output is, in the example embodiment, converted into floating point by conversion block 308 and provided as texture coordinates to texture unit 502 for texture mapping operations. The example embodiment can provide texture filtering as part of texture mapping operation 306. The application programmer should be careful about the texture filtering mode chosen when using lighting calculation 302 to generate texture coordinates. Problems may result due to the fact that the s and t axes in the example embodiment are used for independent factors, but certain types of texture filtering apply to both axes simultaneously. One work around is to duplicate, within the texture map, each entry along the t axis in order to ensure that interpolation between adjacent t values has no effect on the final output. Thus, one-dimensional texture filtering for adjacent values of t will be identical. Mipmap filtering with multiple levels of details can also take place, but this may also act to reduce the number of 1D textures within a given 2D texture map.

In the example embodiment, another complication results from the method of converting the lighting calculation 302 color value into texture coordinates. The color value produced by lighting calculation 302 in the example implementation is an 8-bit integer in the range of 0–255. Convert block 308 converts this integer value into a floating point number by dividing it by 255. However, the value is converted into a texture coordinate by multiplying it by the texture size in the example embodiment. This process means that the application programmer should pay careful attention to the texture coordinate for choosing the 1D texture. Assuming a texture size of 256 and GX_NEAR texture filtering, this will map in manner:

| Color Value | Converted texture coordinate | Nearest value |
| --- | --- | --- |
| 0 | 0 | 0 |
| 64 | 64.251 | 64 |
| 127 | 127.498 | 127 |
| 128 | 128.502 | 129 |
| 192 | 192.753 | 193 |
| 254 | 254.996 | 255 |
| 255 | 256 | 255 |

Due to the conversion process, coordinate value 128 is skipped, and color values 254 and 255 map to the same coordinate value. If we assume a texture size of 256 and GX_LINEAR filtering, we have the following mappings:

| Color Value | Converted texture coordinate | Coords looked up |
| --- | --- | --- |
| 0 | −0.5 | 0, 0 |
| 1 | 0.504 | 0, 1 |
| 2 | 1.508 | 1, 2 |
| 3 | 2.512 | 2, 3 |
| 4 | 3.516 | 3, 4 |
| 126 | 125.994 | 125, 126 |
| 127 | 126.998 | 126, 127 |
| 128 | 128.002 | 128, 129 |
| 253 | 253.492 | 253, 254 |
| 254 | 254.496 | 254, 255 |
| 255 | 255.5 | 255, 255 |

It is safe to use n*2 to convert a table 1D into a color value in the example implementation. However, the 1D textures should be stored in a non-straightforward manner within the 2D texture. The table for n=0 should be stored at coordinate 0 (only), tables for n=1 to n=63 should be stored at n*2−1 and n*2, and tables for n=64 to n=127 should be stored at n*2 and n*2+1. Coordinate 127 may be left empty since it will not normally be accessed in this particular implementation. Other implementations might avoid this issue altogether, or present different conversion issues.

Example More Detailed Transform Unit 300 Description

FIGS. 12–20 show a further example, more detailed embodiment of transform unit 300 including a lighting pipeline used for lighting calculation 302. In the example embodiment of system 50, transform unit 300 supports lighting in hardware as a per-vertex calculation. This means that a color (RGB) value can be computed for every lit vertex, and that these colors can be linearly interpolated over the surface of each lit triangle (known as Gouraud shading). Transform unit 300 in this example embodiment has full support for diffuse local spotlights, and also has some support for infinite specular lighting.

Transform unit 300 in this example embodiment supports diffuse attenuation. This means that the front of the object can be brighter than the sides, and the back darkest. Transform unit 300 supports vertex normals so as to provide diffuse attenuation. For each vertex, the vertex normal (N) is compared against the vector between the vertex and the light position.

The example embodiment of transform unit 300 also supports local lights. Local lights have a position within the world and possibly also a direction. Each light is defined to have a position. Using the position of each vertex and the position the light, transform unit 300 can perform per-vertex distance attenuation. This means you can make the brightness of the light shining on an object decrease as the object moves away from the light.

Transform unit 300 in the example embodiment also supports directional lighting. Support ranges non-directional lights, to subtle directional effects, to highly directional spotlights. These effects are supported by angle attenuation. Thus, vertices directly "in the beam" of the light can be made brighter than vertices outside of the beam or behind the light.

Local diffuse lights can be both distance-attenuated and angle-attenuated. By programming the proper lighting equation, it is possible for an application programmer to obtain attenuation values as an output color or alpha (or, in the case of texture coordinate generation, as a texture coordinate).

In the example implementation, transform unit supports eight physical lights. The application programmer can describe the attenuation parameters, position, direction and color of each light. The application programmer can also control up to four physical color channels that accumulate the result of the lighting equation. By associating lights with channels, the application programmer can choose to sum the effect of multiple lights per vertex, or combine them later in the texture environment unit 600. The number of channels available to the texture environment unit 600 is set by the application programmer. In some cases (e.g., when using a color channel to generate texture coordinates), a light channel is computed but not outputted as a color or opacity. As discussed above, transform unit 300 is pipelined so as calculate two color channels simultaneously, but may provide only one color channel directly to texture environment unit 600 for blending. The other color channel can be provided in the form of texture coordinates to texture unit 500.

Each color channel enables attenuation in the selection of color source. A light mask associates up to eight lights with the channel. See FIG. 12 channel which shows example association of up to eight different lights with any of two color channels and two alpha channels to provide two independent outputs one of which can be converted to texture coordinates.

Figure 12:
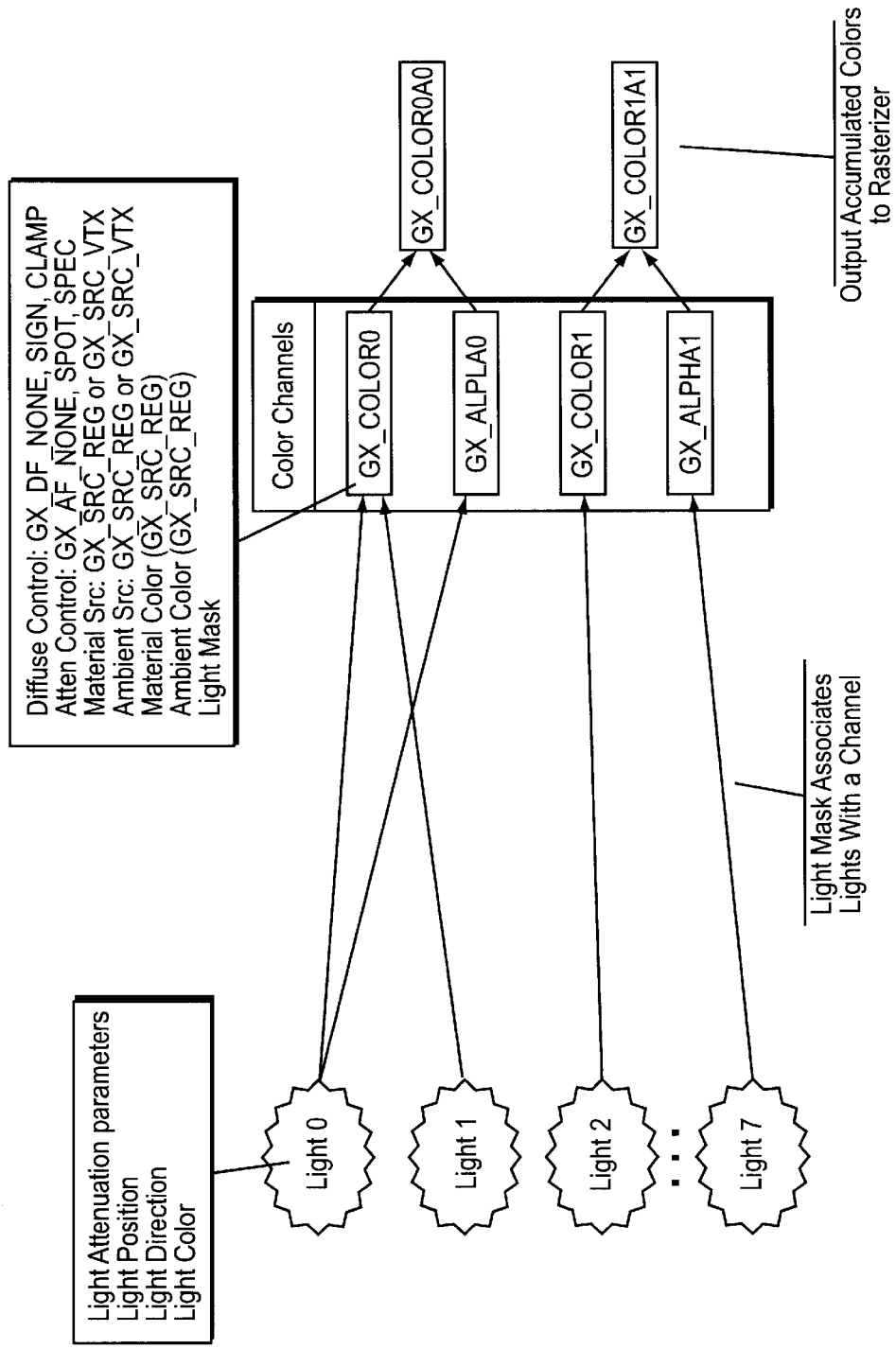
FIG. 12 shows an example association of lights with color channels.

As shown in FIG. 12, transform unit 300 in the example embodiment generates two RGBA colors (color 0 and color 1). Each output color has two lighting functions: one for RGB and one for alpha, for a total of four lighting functions per polygon per vertex. Four such lights allow a variety of lighting effects such as, for example, in multitexturing. Each function can be comprised of a material color in operations based on a global ambient color and the state of the eight lights retained by transform unit 300. The equations enable diffuse, specular and spotlight attenuation. The lighting data path is designed to be optimal for local diffuse spotlights in the preferred example embodiment, but it is also possible to generate specular highlights and/or attenuation factors for texture-based lighting with the same data path. As described above, the light colors can also be used to generate texture coordinates.

Example Lighting Calculation

Example lighting equations performed by transform unit 300 are as follows:

$$C = \begin{cases} Material_c \begin{bmatrix} R \\ G \\ B \end{bmatrix} \times LightFunc \begin{bmatrix} R \\ G \\ B \end{bmatrix}, & \text{if } C = Color_{0_{RGB}}, Color_{1_{RGB}} \\ Material_c[A] \times LightFunc_c[A], & \text{if } C = Color_{0_{Alpha}}, Color_{1_{Alpha}} \end{cases}$$

$$Material_c = MaterialSrc_c = REGISTER? VertexColor_c : MaterialReg_c$$

$$LightFunc_c = \begin{cases} 1.0, & \text{if } LightFuncEnable_c = \text{FALSE} \\ Illum_c, & \text{if } LightFuncEnable_c = \text{TRUE} \end{cases}$$

$$Illum_c = Clamp\left(Amb_c + SignedInt\left(\sum_{i=0}^{i=7} Enable_c(i) Atten_c(i) DiffuseAtten_c(i) Color_i\right)\right)$$

$$Amb_c = (AmbSrc_c = REGISTER? VertexColor_c : AmbientReg)$$

In the example embodiment, the material and global ambient colors can come from a register or in the form of a vertex color from command processor 200. An application requiring more than eight lights can compute the illumination from the additional lights, based on software executing on main processor 110, so that the result is one of the vertex colors, and set the ambient source register to use that vertex color. It is also possible if desired for main processor 110 to compute any or all of the lighting calculations using software and provide those resulting computation outputs in the form of vertex colors to transform unit 300 for conversion into texture coordinates; or the main processor may pass the computed texture coordinates to texture unit 500 for purposes of texture mapping.

Disabling the "LightFunc" parameter passes the material color through transform unit 300 unchanged. This can be used to allow main processor 110 to directly select, based on application program software control, which of a plurality 1D textures to use in a texture mapping operation responsive to an achromatic lighting function output.

Any or all of the available eight lights can be enabled in each lighting function. The sum of the per-light illumination is clamped to [−1, 1] in the example embodiment, and converted to integer 2's complement before adding the global ambient term. Since the total illumination is clamped to [0, 1], a material cannot become brighter through lighting in the example embodiment. If this effect is desired, the light colors can be premultiplied by the material color, and the material color in the equation can be set to 1.0. Other arrangements can be provided in other example implementations to allow materials to become brighter through lighting.

In the example embodiment, the alpha equations can be used when monochrome results are sufficient. The resulting alpha values can be combined with other RGB and alpha values in texture environment unit 600 in the example embodiment. For example, it is possible to put the diffuse result in the color output for the channel 0 color, a specular result in the alpha output of the color 0 channel, and have the texture environment unit 600 multiply the diffuse color by the texture color and add a (e.g., white) specular highlight in a single stage of texture environment unit 600.

Flexibility is provided in the diffuse attenuation function in the example embodiment, beyond the command (N·H)

clamp to [0, 1]. Attenuation can be defeated for lighting equations which do not have a diffuse property or left unclamped. Unclamped dot products allow light-based texture generation to control illumination for 180°. Since the illumination will be clamped in the example embodiment, signed lighting functions may be scaled and biased appropriately using $color_c$ and $amb_c$. The example embodiment provides three example diffuse attenuation functions a lighting equation can use:

$$DiffuseAtten_c(i) = \begin{cases} 1.0, & \text{if } DiffAttenSelect_c = \text{NONE} \\ \hat{N} \cdot \hat{L}_i, & \text{if } DiffAttenSelect_c = \text{SIGNED (if SPOTLIGHT only)} \\ Clamp0(\hat{N} \cdot \hat{L}_i), & \text{if } DiffAttenSelect_c = \text{CLAMP (if SPOTLIGHT only)} \end{cases}$$

The angle attenuation logic in the example embodiment computes a second-order polynomial based on the dot product of the light-to-vertex vector and the light-direction vector. A sharp fall off is achieved by extrapolating the squared and linear terms. Clamping is used to avoid negative values produced by extrapolation for angles outside of a spotlight angle. Range attenuation can be performed by the inverse of another second-order polynomial. The distance value, d, is the length of the vector from the vertex to the light position. A light equation with only distance attenuation can be used for texture-based lights to simulate the distance-based illumination falloff of projected or other textures.

This same logic can be used to approximate common specular attenuation, $(N \cdot H)^s$ for a parallel light source. The light-to-vertex and light-direction vectors may be replaced with the normal and half-angle vectors respectively. Attenuation can be defeated in a lighting function to permit non-attenuated point light (e.g., omni-direction) sources to be used in both a diffuse and specular equation. In this example, the light's angle attenuation coefficients may be used for the specular equation, and attenuation is turned off in the diffuse equation. Specular and diffuse equations in the example embodiment are combined in texture environment 600 as opposed to within transform unit 300 in the example embodiment, but other implementations are possible.

Further details of the example attenuation function are as follows:

$$Atten_c = AttenEnable_c ? \frac{Clamp0(a_{2_i} AAtt_c(i)^2 + A_{1_i} AAtt_c(i) + A_{0_i})}{K_{2_i} d_c^2(i) + k_{1_i} d_c(i) + k_{0_i}} : 1.0$$

$$AAtt_c(i) = \begin{cases} \hat{N} \cdot \hat{L} > 0 ? clamp0(\hat{N} \cdot H_i) : 0, & \text{if } AttenSelect_c = \text{SPECULAR} \\ clamp0(\hat{L} \cdot L_{dir_i}), & \text{if } AttenSelect_c = \text{SPOTLIGHT} \end{cases}$$

$$d_c(i) = \begin{cases} \hat{N} \cdot \hat{L} > 0 ? clamp0(\hat{N} \cdot H_i) : 0, & \text{if } AttenSelect_c = \text{SPECULAR} \\ \sqrt{L_i \cdot L_i}, & \text{if } AttenSelect_c = \text{SPOTLIGHT} \end{cases}$$

Example Transform Unit 300 Implementation Block Diagram

Figure 13:
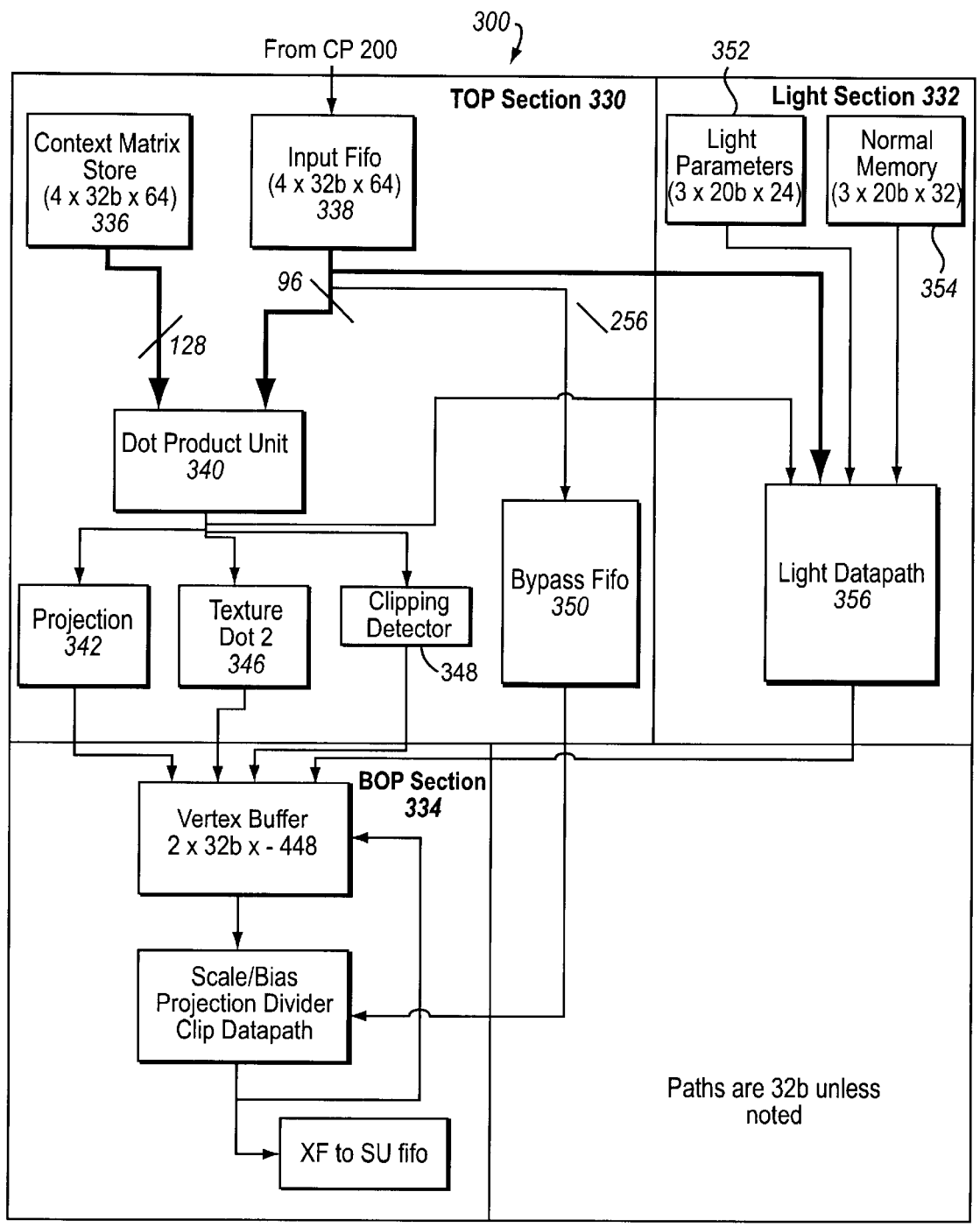
FIG. 13 shows an example transform unit implementation.

FIG. 13 is a block diagram of an example implementation of transform unit 300 of system 50. Transform unit 300 in this example embodiment includes three main sections:

top-of-pipeline section 330, light section 332, bottom-of-pipeline section 334.

The top-of-pipeline section 330 in the example embodiment includes light section 332, a context matrix store 336, an input FIFO buffer 338, a dot product unit 340, a projection block 342, a texture dot two block 346, a cripping detector 348, and a bypass FIFO block 350. In the example embodiment, top-of-pipeline (TOP) section 330 performs the following example functions:

vertex transform (3 dot products),

Normal transform (3 dot products), texture transform (2 or 3 dot products for texture), projection transform (simplified 3 dot products); and light section 332 performs the following example color channel functions:

color channel 0 diffuse computation (1 dot product N·L), color channel 0 diffuse computation (1 dot product $L^2$ per light), color channel 0 diffuse computation (1 dot product $N^2$).

In addition, the input FIFO receives per-vertex vertex descriptors specifying, for example, the following information:

geometry information XYZ,

Normal vector information $N_x$, $N_y$, $N_z$,

RGBA color 0 per vertex,

RGBA color 1 per vertex,

Binormal vector $T_x$, $T_y$, $T_z$,

Binormal vector $B_x'$ $B_y$, $B_z$

Texture 0 data $T_0$,

Texture 1 to n data $S_n$, $T_n$.

Appropriate per-vertex information is provided to light section 332 to enable the lighting computations.

Light section 332 in the example embodiment shown in FIG. 13 includes a lighting parameters memory 352, a Normal memory 354 and a light data path 356.

Light parameter memory 352 stores various light parameters used by light data path 356. Light parameter store 352 thus holds all of the various lighting information (e.g., light vectors, light parameters, etc.). Both global state and ambient state are stored in this memory in the example embodiment. In the example embodiment, each word is written in 32-bits, but only the twenty most significant bits are kept. Each location is three words wide, with minimum word write size of three words in the example embodiment. The following shows example contents of light parameter memory 352:

| Register Address | Definition | Configuration |
|---|---|---|
| 0/0600 | Reserved | |
| 0x0601 | Reserved | |
| 0x0602 | Reserved | |
| 0x0603 | Light0 | 32b: RGBA (8b/comp) |
| 0x0604 | Light0A0 | 20b: cos atten. $A_0$ |
| 0x0605 | Light0A1 | 20b: cos atten. $A_1$ |
| 0x0606 | Light0A2 | 20b: cos atten. $A_2$ |
| 0x0607 | Light0K0 | 20b: dist atten. $K_0$ |
| 0x0608 | Light0K1 | 20b: dist atten. $K_1$ |
| 0x0609 | Light0K2 | 20b: dist atten. $K_2$ |
| 0x060a | Light0Lpx | 20b: x light pos, or inf 1dir x |
| 0x060b | Light0Lpy | 20b: y light pos, or inf 1diry y |
| 0x060c | Light0Lpz | 20b: z light pos, or inf 1dir z |
| 0x060d | Light0Dx/Hx | 20b: light dir x, or 1/2 angle x |
| 0x060e | Light0Dy/Hy | 20b: light dir y, or 1/2 angle y |
| 0x060f | Light0Dz/Hz | 20b: light dir z, or 1/2 angle z |

-continued

| Register Address | Definition | Configuration |
|---|---|---|
| 0x0610-0x067f | Light(n)data | See Light0 data |
| 0x0680-0x07ff | Not used | Reserved |

Figure 14:
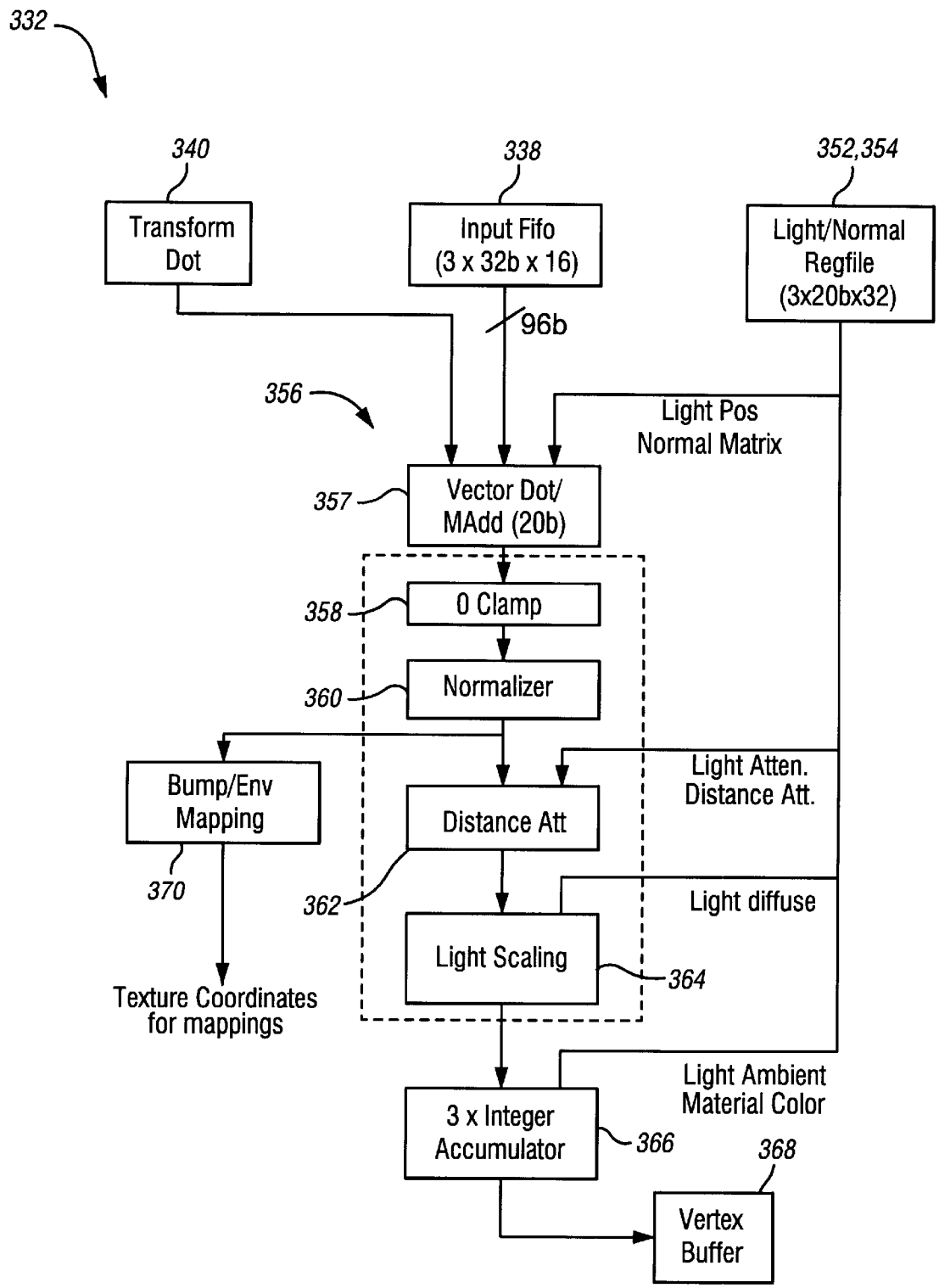
FIG. 14 shows an example lighting pipeline implementation.

An overview of the light section 332 of the example embodiment is shown in FIG. 14. Briefly, the light section 332 performs the following local lighting computations:

$$\begin{bmatrix} R \\ G \\ B \end{bmatrix} = Material_0 \begin{bmatrix} Mr \\ Mg \\ Mb \end{bmatrix}$$

$$\left( Ambient_0 \begin{bmatrix} Ra \\ Ga \\ Ba \end{bmatrix} + \frac{CosAtFunc_0}{DistAtFunc_0} Clamp(Normal \cdot Light_i) \times Diffuse_i \begin{bmatrix} Rd \\ Gd \\ Bd \\ 0.0 \end{bmatrix} \right)$$

This requires a local light vector computation per vertex:

$$Light_i = Normalized \left( LightPos_i \begin{bmatrix} Lx \\ Ly \\ Lz \end{bmatrix} - EyeSpaceVertex \begin{bmatrix} Xh \\ Yh \\ Zh \end{bmatrix} \right)$$

after which, we need to compute:

$$DifuseAtten_0 = Conditional\_clamp\_to\_0(Light_i \cdot EyeSpaceNormal)$$

Thus, the diffuse attenuation calculation requires the light vector and the eye-space Normal. Clamping to 0 may be conditional on an internal flag (e.g., it can be clamped to 1.0 or not clamped at all) in the example implementation. It is possible to allow diffuse lights to have negative dot products. A lighting dot product unit can compute the eye-space Normal while the transform dot product unit computes the geometry eye-space conversion. Then, a lighting dot product unit can compute the N·L, L2 and $N^2$ dot products. After this, the example embodiment normalizes the results to provide normalized light vector Normal information. After normalization, the intermediate results of the normalization (e.g., distance squared and distance and cosine N·L) are used to compute the attenuation equations as well as the normalization factors. Then, the light ambient vector is multiplied. The resulting triplet is the per-light attenuated diffuse component. This is converted to 2's complement integer, and the resulting three values are accumulated in an integer accumulator. This accumulator adds the ambient terms and any other diffuse terms from other lights. The final sum is then the per-vertex color (in the example embodiment, an 8-bit RGB format clamped to 0 to 255).

Figure 15:
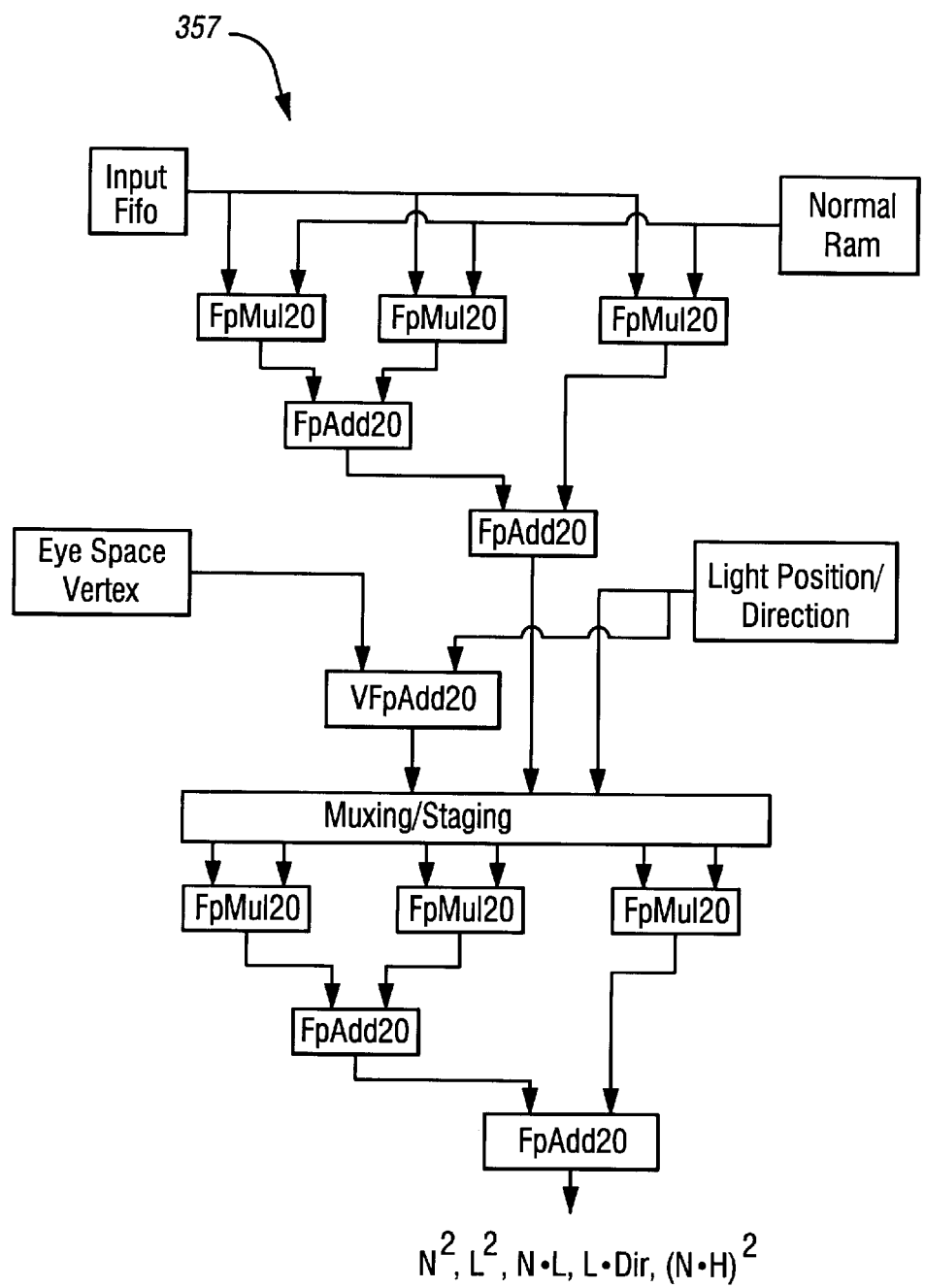
FIG. 15 shows an example vector dot/add unit implementation.

FIG. 15 shows an example diagram of the vector dot/Madd block 357 shown in FIG. 14. If the same dot product unit is used to compute the transform N and all other dot products, then the performances may become somewhat degraded and the scheduling of light becomes difficult since each light needs to re-use the same data path element multiple times. This may lead to complex control issues. To simplify the design, we can implement a second limited dot product unit to separate the various computations. The first dot product unit may compute the transform normal while the other dot product unit computes the vertex transformation. A vector add may then compute the light vector for local lighting. The second dot product may compute $N^2$, $L^2$, N·L and N·H (for specular lights). This can be achieved in the example embodiment in a fully pipelined way with no feedbacks. See FIG. 15.

Figure 16:
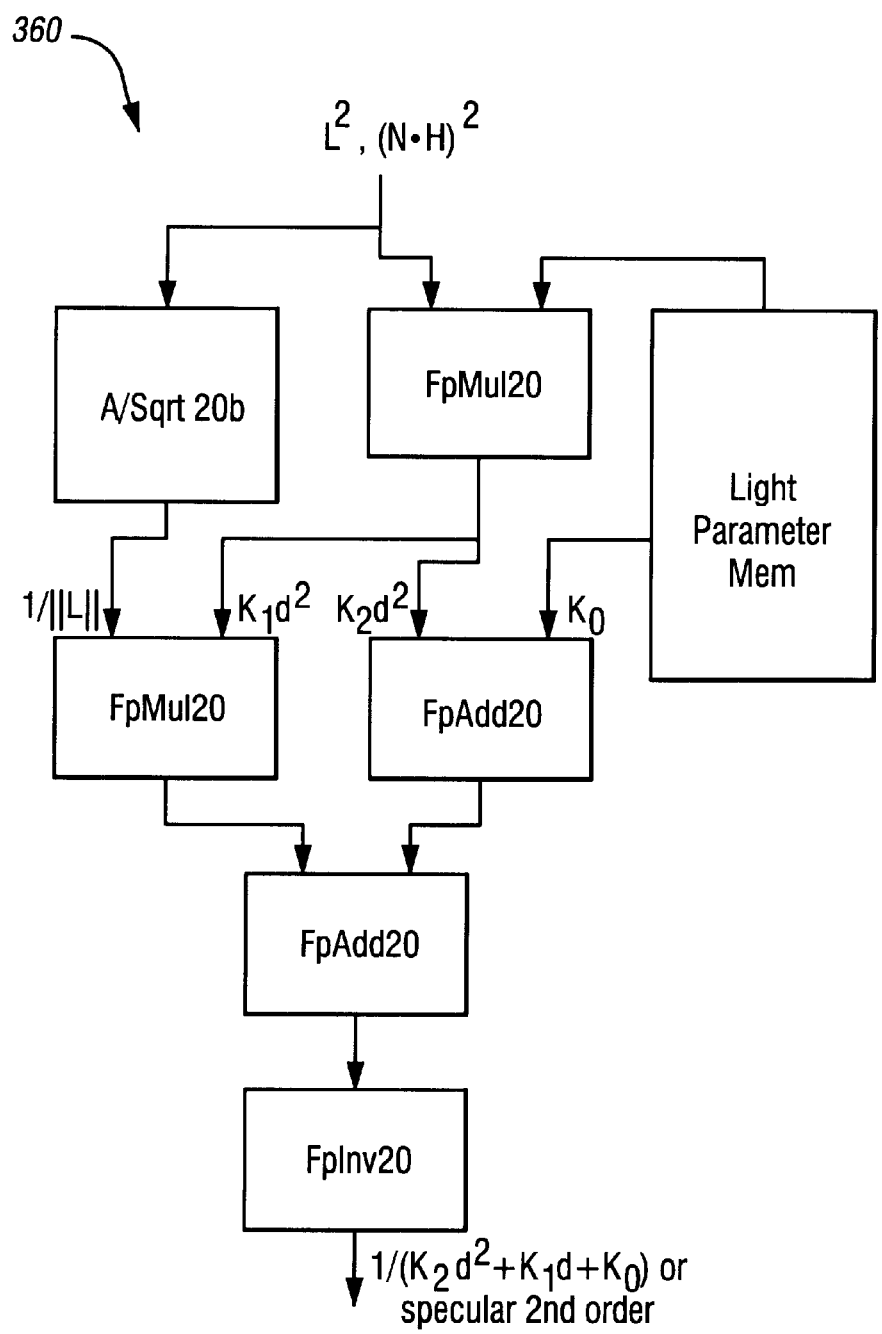
FIG. 16 shows an example normalizer implementation.

FIG. 16 shows an example implementation of the normalizer 360 shown in FIG. 14. Once the lighting vector values are computed, the example embodiment normalizes the results and computes attenuation. Example embodiment normalizer 360 accepts the following inputs:

Cosine attenuation: L·Dir, 1/sqrt (L)

Distance attenuation: $L^2$, L

Figure 17:
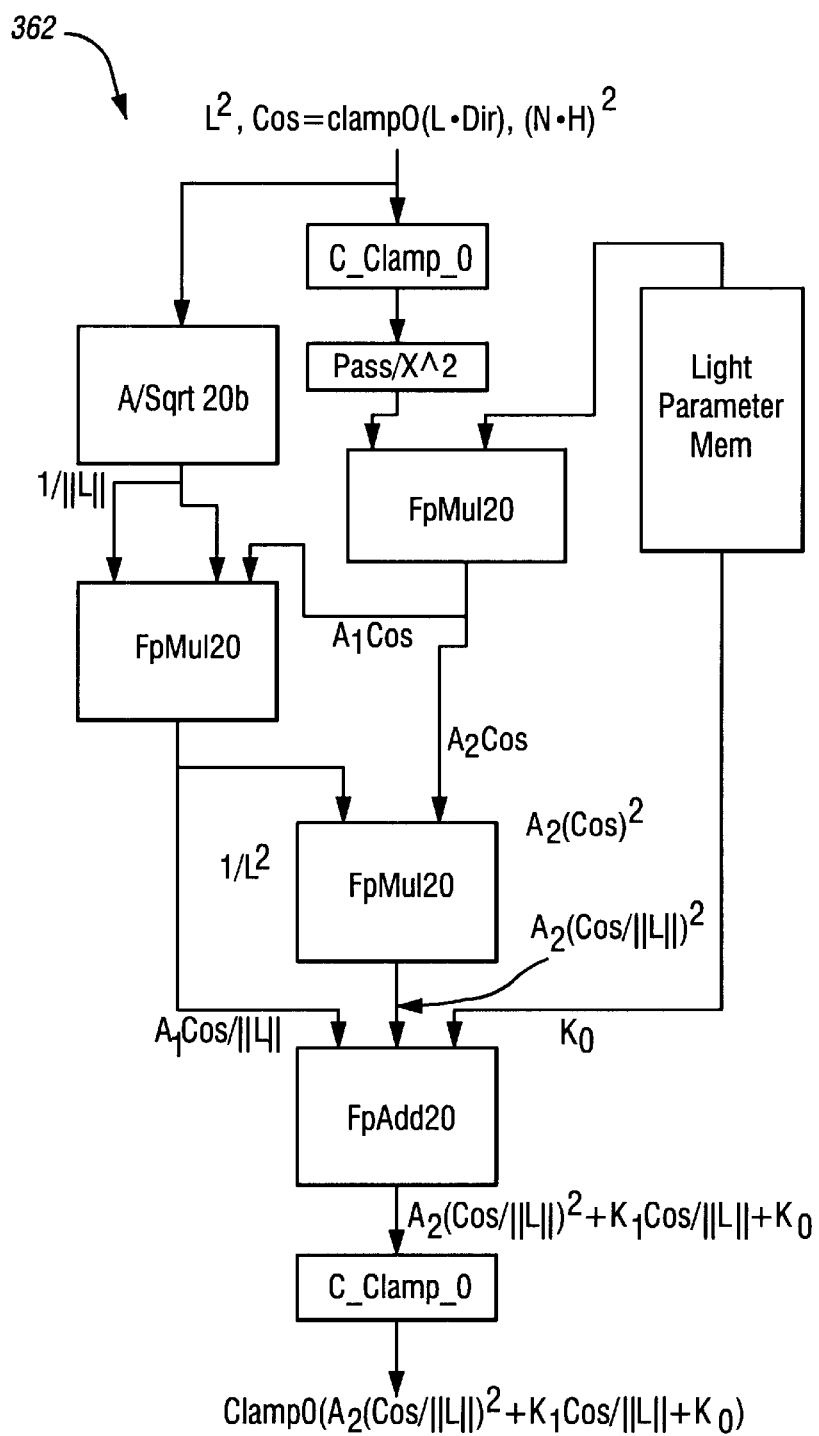
FIG. 17 shows an example distance attenuator implementation.
Figure 18:
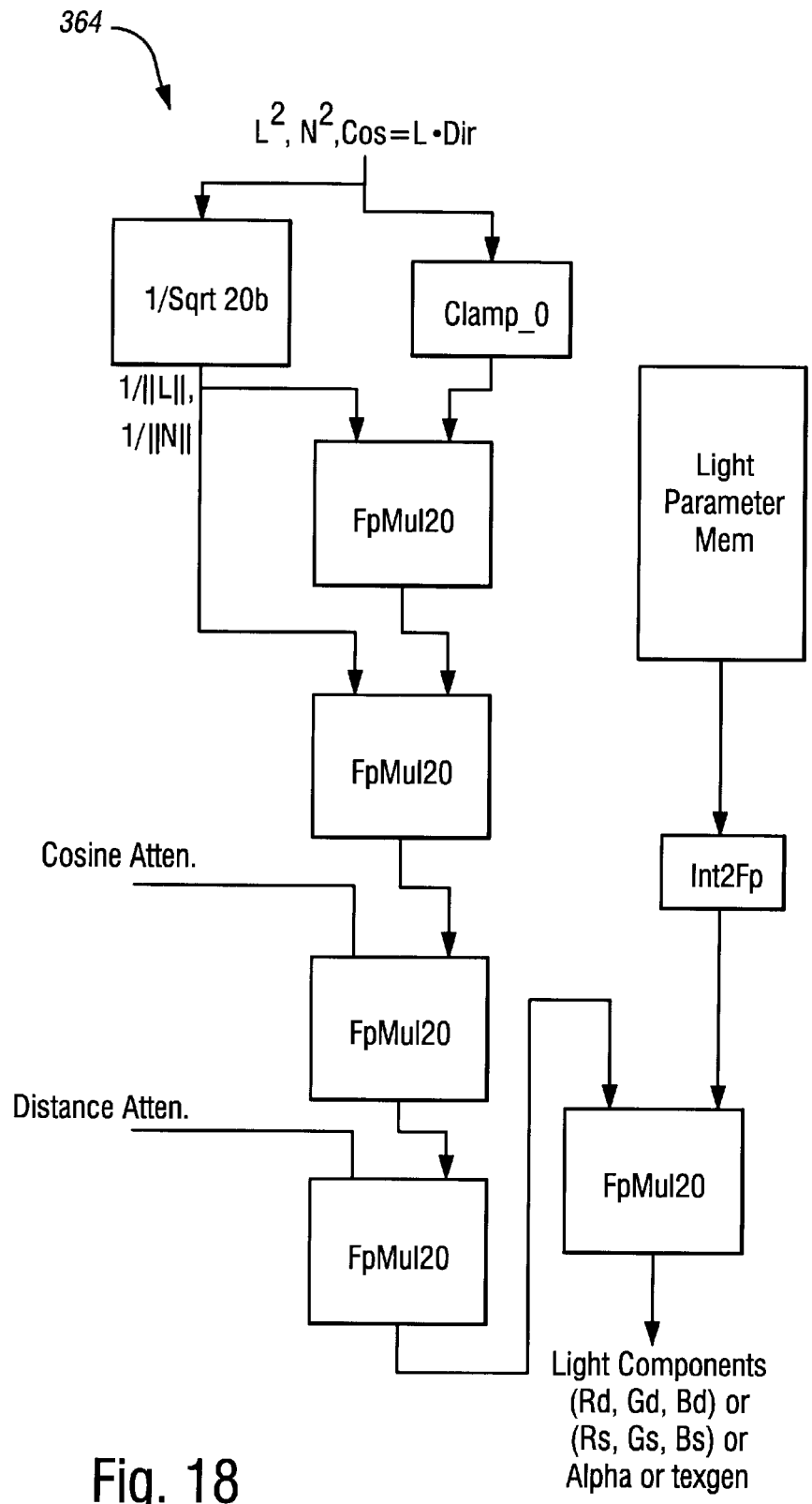
FIG. 18 shows an example light scaler implementation.

Diffuse factor: N·L, $N^2$, $L^2$, and computes distance attenuation using the following step performed by example normalizer 360 shown in FIG. 16:

1. Compute $K_2 d^2$
2. Compute $K_2 d^2_{+K0}$
3. Compute d
4. Compute $K_1 d$
5. Compute $D_2 D^2 + K_1 d + K0$
6. Compute $1/(K_2 d^2 + K_1 d + K0)$ FIG. 17 shows an example distance attenuation unit 362. The example distance attenuator implementation 362 computes cosine attenuation using the following example steps:

1. Compute Cos=Clamp0(L.Ldir)
2. Compute $Cos_2$
3. Compute $A_2 Cos^2$
4. Compute $A_1 Cos$
5. Compute $A_1 Cos + A0$
6. Compute $A_2 Cos^2 + A_1 Cos + A0$
7. Compute $Clamp\_0(A+2+Cos^2+A_1 Cos+A0)$ FIG. 18 shows an example implementation of light scaler 364 that computes the following:

1/sqrt ($N^2$)

1/sqrt ($L^2$)

N·L (sqrt ($N^2$)×sqrt($L^2$)).

Some of the units (e.g., 1/sqrt and some of the multipliers) can be shared among the various data path implementations shown in FIGS. 15–18. Thus,.an implementation might approximately-require on the order of eighteen multipliers and ten adders. Inversion and 1/sqrt can be performed using a table lookup or a simple one-pass Newton-Raphson interpolator or some other pipeline interpolator. Alpha and specular writing computations do not require any additional hardware in the example embodiment since they are just changes in the lighting equation.

Figure 19:
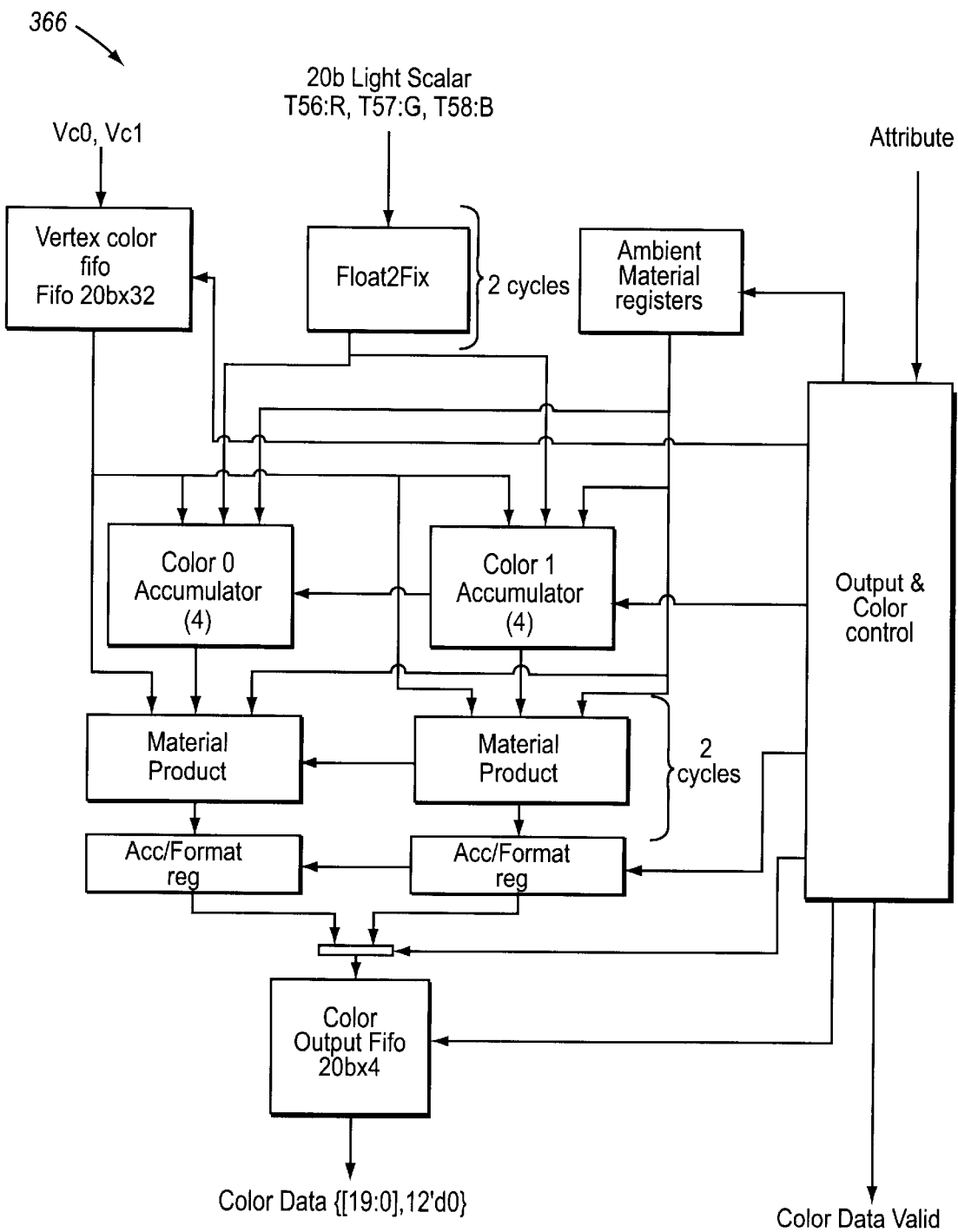
FIG. 19 shows an example integer accumulator implementation.

FIG. 19 shows an example integer accumulator 336 implementation. When a new attribute arrives for each color, that color is accumulated. Once all lights are accumulated for a color, and the ambient is added (e.g.; from the vertex color FIFO or from a register) then the material color is multiplied. The final RGB/A color is then accumulated into an accumulation/format register by construction of the final color and texture generation. Once the color/texture is computed, it is then written into an output FIFO. Control may follow these general guidelines:

---

If (new attribute = = new light for color X)
    Accumulate new light into color X
    Increment number of lights for color X

```
End
If (number of lights for color X is maximum)
    Transfer color to multiplier
    Perform material multiply
End
If (color X is in multiply state)
    Accumulate color X first
End
If (Accumulation of color X is complete (RGBX or AXX or RGBA))
    Format color X for color, if color enabled
    Format color X for texture, if texture enabled and color disabled or
        color already loaded
    Load output fifo with formatted data, increment color/texture count
End
If (color count and texture count at maximum)
    Write data to BOP
    Pop fifo
End
```

Figure 20:
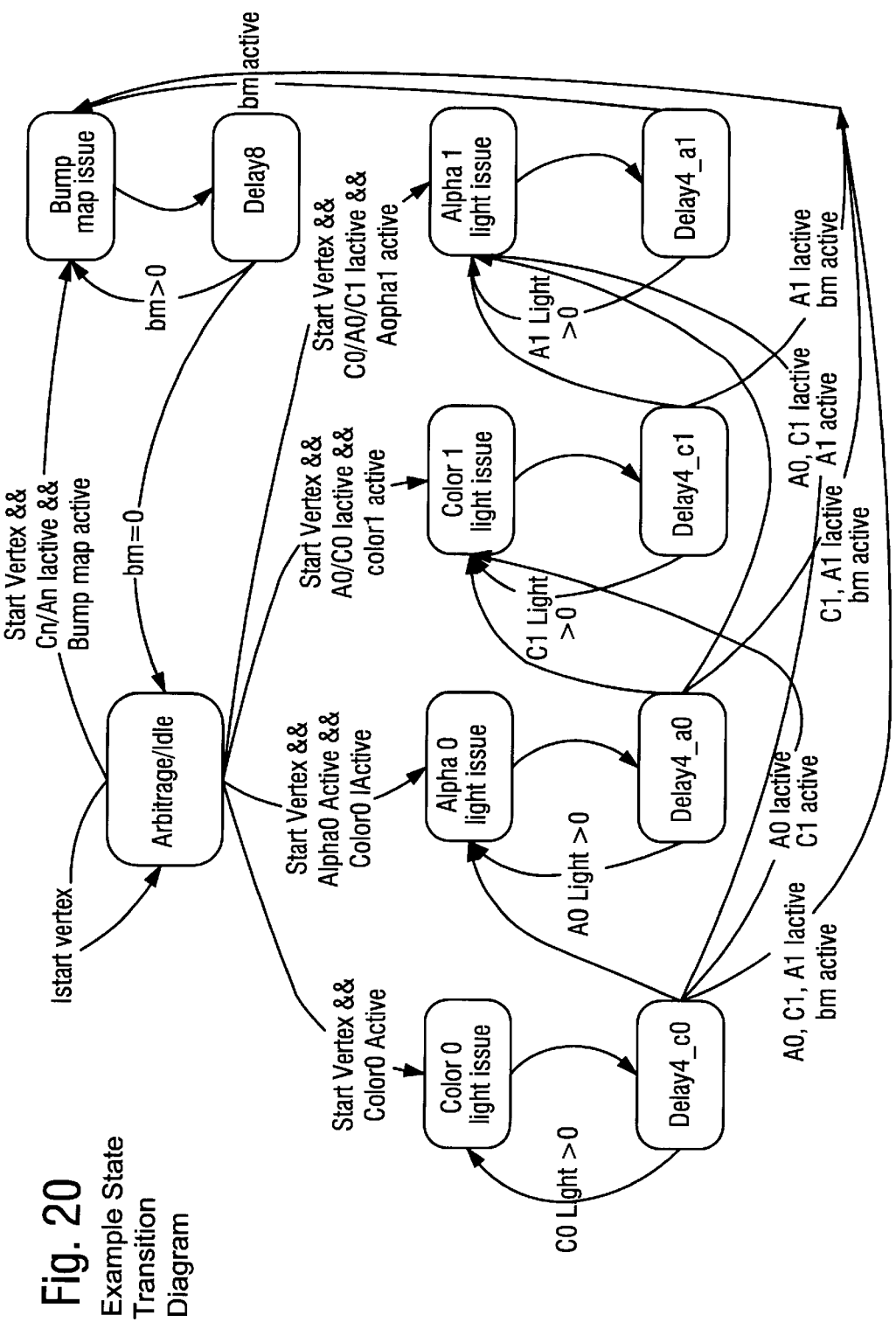
FIG. 20 shows an example state transition diagram.

FIG. 20 shows an example stage transition diagram used to control light pipeline 332 in the example embodiment. Arbiter logic decides the sequence of events that it issued into the light data path. The example embodiment arbiter can only issue a new event every four or eight cycles, depending on the event. The list of possible events includes:

light computation for a specific color/alpha, bump map computation.

For the above events, the arbiter drops an attribute into the control pipeline every 4/8 cycles. Each of these attribute carries the execution instructions for the event into the light pipeline 332. At the end of the pipeline, the attributes are used to increment local counts which are used to determine if the colors/textures are complete.

The following shows example control registers used to control how transform unit 300 behaves, treats data and textures, etc.:

| Register Address | Definition | Configuration |
|---|---|---|
| 0x1000 | Error | |
| 0x1001 | Diagnostics | |
| 0x1002 | State0 | Internal state register0 |
| 0x1003 | State1 | Internal state register1 |
| 0x1004 | Xf_clock | Enables power saving mode |
| | | 0: No power saving when idle |
| | | 1: Enable power saving when idle |
| 0x1005 | ClipDisable | Disables some or all of clipping |
| | | B[0]: When set, disables clipping detection (0 default) |
| | | B[1]: When set, disables trivial rejection (0 default) |
| | | B[2]: When set, disables cpoly clipping acceleration (0 default) |
| 0x1006 | Perf0 | Performance monitor selects |
| 0x1007 | Perf1 | Xform target performance register: |
| | | [6:0]: Xform internal target performance (Cycles/vertex) |
| 0x1008 | InVertexSpec | B[1:0]: Specifies host supplied color0 usage: |
| | | 0: No host supplied color information |
| | | 1: Host supplied color0 |
| | | 2: Host supplied color0 and color1 |
| | | B[3:2]: Specifies host supplied normal: |
| | | 0: No host supplied normal |
| | | 1: Host supplied normal |
| | | 2: Host supplied normal and binormals |
| | | B[7:4]: Specifies # of host supplied texture coordinates |
| | | 0: No host supplied textures |
| | | 1: 1 host supplied texture pair (S0, T0) |
| | | 2-8: 2-8 host supplied texturepairs |
| | | 9-15: Reserved |
| 0x1009 | NumColors | Specifies the number of colors to output: |
| | | 0: No xform colors active |
| | | 1: Xform supplies 1 color (host supplied or computed) |
| | | 2: Xform supplies 2 colors (host supplied or computed) |
| 0x100a | Ambient0 | 32b: RGBA (8b/comp) Ambient color0 specifications |
| 0x100b | Ambient1 | 32b: RGBA (8b/comp) Ambient color1 specifications |
| 0x100c | Material 0 | 32b: RGBA (8b/comp) global color0 material specifications |
| 0x100d | Material 1 | 32b: RGBF (8b/comp) global color1 material specification |
| 0x100e | Color0Cntrl | B[0]: Color0 Material source |
| | | 0: Use register (Material 0) |
| | | 1: Use CP supplied Vertex color 0 |
| | | B[1]: Color0 LightFunc |
| | | 0: Use 1.0 |
| | | 1: Use Illum0 |
| | | B[2]: Light0 is source |
| | | 0: Do not use light |
| | | 1: Use light |
| | | B[3]: Light1 is source |
| | | 0: Do not use light |
| | | 1: Use light |
| | | B[4]: Light2 is source |
| | | 0: Do not use light |
| | | 1: Use light |
| | | B[5]: Light3 is source |
| | | 0: Do not use light |
| | | 1: Use light |
| | | B[6]: Ambient source |
| | | 0: Use register Ambient0 register |
| | | 1: Use CP supplied vertex color 0 |
| | | B[8:7]: DiffuseAtten function |
| | | 0: Select 1.0 |
| | | 1: Select N.L, signed |
| | | 2: Select N.L clamped to [0,1.0] |
| | | B[9]: AttenEnable function |
| | | 0: Select 1.0 |
| | | 1: Select Attenuation fraction |
| | | B[10]: AttenSelect function |
| | | 0: Select specular (N.H) attenuation |
| | | 1: Select diffuse spotlight (L.Ldir) attenuation |
| | | B[11]: Light4 is source |
| | | 0: Do not use Light |
| | | 1: Use light |
| | | B[12]: Light 5 is source |
| | | 0: Do not use Light |
| | | 1: Use light |
| | | B[13]: Light 6 is source |
| | | 0: Do not use Light |
| | | 1: Use light |
| | | B[14]: Light 7 is source |
| | | 0: Do not use Light |
| | | 1: Use light |
| 0x100f | Color1Cntrl | B[0]: Color Material source |
| | | 0: Use register (Material 1) |
| | | 1: Use CP supplied Vertex color 1 |
| | | B[1]: Color1 LightFunc |
| | | 0: Use 1.0 |
| | | 1: Use Illum1 |
| | | B[2]: Light0 is source |
| | | 0: Do not use light |
| | | 1: Use light |
| | | B[3]: Light1 is source |
| | | 0: Do not use light |
| | | 1: Use light |
| | | B[4]: Light2 is source |
| | | 0: Do not use light |
| | | 1: Use light |
| | | B[5]: Light3 is source |
| | | 0: Do not use light |
| | | 1: Use light |

-continued

| Register Address | Definition | Configuration |
|---|---|---|
| | | B[6]: Ambient source<br>0: Use register Ambient1 register<br>1: Use CP supplied vertex color 1<br>B[8,7]: DiffuseAtten function<br>0: Select 1.0<br>1: Select N.L, signed<br>2: Select N.L clamped to [0,1.0]<br>B[9]: AttenEnable function<br>0: Select 1.0<br>1: Select Attenuation fraction<br>B[10]: AttenSelect function<br>0: Select specular (N.H) attenuation<br>1: Select diffuse spotlight (L.Ldir) attenuation<br>B[11]: Light4 is source<br>0: Do not use Light<br>1: Use light<br>B[12]: Light 5 is source<br>0: Do not use light<br>1: Use light<br>B[13]: Light 6 is source<br>0: Do not use light<br>1: Use light<br>B[14]: Light7 is source<br>0: Do not use light<br>1: Use light |
| 0x1010 | Alpha0Cntrl | B[0]: Color0 alpha Material source<br>0: Use register (Material 0 alpha)<br>1: Use CP supplied Vertex color 0 alpha<br>B[1]: Color0 alpha Light Func<br>0: Use 1.0<br>1: Use Illum0<br>B[2]: Light0 alpha is source<br>0: Do not use light<br>1: Use light<br>B[3]: Light1 alpha is source<br>0: Do not use light<br>1: Use light<br>B[4]: Light2 alpha is source<br>0: Do not use light<br>1: Use light<br>B[5]: Light 3 alpha is source<br>0: Do not use light<br>1: Use light<br>B[6]: Ambient source<br>0: Use register Ambient0 alpha register<br>1: Use CP supplied vertex color 0 alpha<br>B[8,7]: DiffuseAtten function<br>0: Select 1.0<br>1: Select N.L, signed<br>2: Select N.L clamped to [0,1.0]<br>B[9]: AttenEnable function<br>0: Select 1.0<br>1: Select Attenuation fraction<br>B[1-]: AttenSelect function<br>0: Select specular (N.H) attenuation<br>1: Select diffuse spotlight (L.Ldir) attenuation<br>B[11]: Light4 is source<br>0: Do not use Light<br>1:Use light<br>B[12]: Light 5 is source<br>0: Do not use Light<br>1: Use Light<br>B[13]: Light 6 is source<br>0: Do not use Light<br>1: Use light<br>B[14]: Light 7 is source<br>0: Do not use Light<br>1: Use light |
| 0x1011 | Alpha1Cntrl | B[0]: Color1 alpha Material source<br>0: Use CP supplied Vertex color 1 alpha<br>B[I]: Color1 alpha LightFunc<br>0: Use 1.0<br>1: Use Illum0<br>B[2]: Light0 alpha is source<br>0: Do not use light<br>1: Use light<br>B[3]: Light1 alpha is source<br>0: Do not use light<br>1: Use light<br>B[4]: Light2 alpha is source<br>0: Do not use light<br>1: Use light<br>B[5]: Light3 alpha is source<br>0: Do not use light<br>1: Use light<br>B[6]: Ambient source<br>0: Use register Ambient1 alpha register<br>1: Use CP supplied vertex color 1 alpha<br>B[8,7]: DiffuseAtten function<br>0: Select 1.0<br>1: Select N.L, signed<br>2: Select N.L clamped to [0,2.0]<br>B[9]: AttenEnable function<br>0: Select 1.0<br>1: Se]ect Attenuation fraction<br>B[10]: AttenSelect function<br>0: Select specular (N.H) attenuation<br>1: Select diffuse spotlight (L.Ldir) attenuation<br>B[11]: Light 4 is source<br>0: Do not use Light<br>1: Use light<br>B[12]: Light 5 is source<br>0: Do not use Light<br>1: Use light<br>B[13]: Light 6 is source<br>0: Do not use Light<br>1: Use light<br>B[14]: Light 7 is source<br>0: Do not use Light<br>1: Use light |
| 0x1012 | DualTexTran | B[0]: When set(1), enables dual transform for all texture coordinates. When reset (0), disables dual texture transform feature [rev B] |
| 0x1018 | MatrixIndex0 | B[5:0]: Geometry matrix index<br>B[11:6]: Tex0 matrix index<br>B[17:12]: Tex1 matrix index<br>B[23:18]: Tex2 matrix index<br>B[29:24]: Tex3 matrix index |
| 0x1019 | MatrixIndex1 | B[5:0]: Tex4 matrix index<br>B[11:6]: Tex5 matrix index<br>B[17:12]: Tex6 matrix index<br>B[23:18]: Tex7 matrix index |
| 0x101a | ScaleX | Viewport scale X |
| 0x101b | ScaleY | Viewport scale Y |
| 0x101c | ScaleZ | Viewport scale Z |
| 0x101d | OffsetX | Viewport offset X |
| 0x101e | OffsetY | Viewport offset Y |
| 0x101f | OffsetZ | Viewport offset Z |
| 0x1020 | ProjectionA | A parameter in projection equations |
| 0x1021 | ProjectionB | B parameter in projection equations |
| 0x1022 | ProjectionC | C parameter in projectlon equations |
| 0x1023 | ProjectionD | D parameter in projection equations |
| 0x1024 | ProjectionE | E parameter in projection equations |
| 0x1025 | ProjectionF | F parameter in projection equations |
| 0x1026 | ProjectOrtho | If set selects orthographic otherwise non-orthographic (Zh or 1.0 select) |
| 0x103f | NumTex | Number of active textures |
| 0x1040 | Tex0 | B0: Reserved<br>B1: texture projection<br>0: (s,t): texmul is 2x4<br>1: (s,t,q): texmul is 3x4<br>B2: input form (format of source input data for regular textures)<br>0: (A, B, 1.0, 1.0) (used for regular texture source)<br>1: (A, B, C, 1.0) (used for geometry or normal source)<br>B3: Reserved<br>B[6,4]: texgen type<br>0: Regular transformation (transform incoming data)<br>1: texgen bump mapping |

-continued

| Register Address | Definition | Configuration |
|---|---|---|
| | | 2: Color texgen: (s,t)=(r,g:b) (g and b are concatenated), color0 |
| | | 3: Color texgen: (s,t)=(r,g:b) (g and b are concatenated), color 1 |
| | | B[11:7]: regular texture source row: Specifies location of incoming textures in vertex (row specific) (i.e.: geometry is row0, normal is row1, etc . . . ) for regular transformations (refer to the table below) |
| | | B[14:12]: bump mapping source texture: n: use regular transformed tex(n) for bump mapping source |
| | | B[17:15]: Bump mapping source light: n: use light #n for bump map direction source (10 to 17) |
| 0x1041 | Tex1 | See Tex0 |
| 0x1042 | Tex2 | See Tex0 |
| 0x1043 | Tex3 | See Tex0 |
| 0x1044 | Tex4 | See Tex0 |
| 0x1045 | Tex5 | See Tex0 |
| 0x1046 | Tex6 | See Tex0 |
| 0x1047 | Tex7 | See Tex0 |
| 0x1050 | Dual Tex0 | B[5:0]: Indicates which is the base row of the dual transform matrix for regular texture coordinate0. [Rev B] B[7:6]: Not used. B[8]: specifies if texture coordinate should be normalized before send transform. |
| 0x1051 | DualTex1 | See DualTex0 |
| 0x1052 | DualTex2 | See DualTex0 |
| 0x1053 | DualTex3 | See DualTex0 |
| 0x1054 | DualTex4 | See DualTex0 |
| 0x1055 | DualTex5 | See DualTex0 |
| 0x1056 | DualTex6 | See DualTex0 |
| 0x1057 | DualTex7 | See DualTex0 |

Example Application Programming Interface

The following are some example API calls relevant to generation of texture coordinates from lighting functions in an example implementation:

GXSetTexCoordGen

Description

Use this function to specify how texture coordinates are generated. Output texture coordinates are usually the result of some transform of an input attribute; either position, normal, or texture coordinate. You can also generate texture coordinates from the output color channel of the per-vertex lighting calculations.

In C-language syntax the texture coordinate generation function would look like this:

dst_coord=func(src_param, mtx);
An example usage of an example API function call is:
void GXSetTexCoordGen(
   GXTexCoordID dst_coord,
   GXTexGenType func,
   GXTexGenSrc src_param,
   u32 mtx);

The current vertex descriptor as set by GXSetVtxDesc describes the data input to the graphics processor. Using GXSetTexCoordGen, the application can create new output texture coordinates from the input data. The dst_coord parameter is used to give the output texture coordinate a name. This texture coordinate can be bound to a texture using GXSetTevOrder. The function GXSetNumTexGens specifies a consecutive number of texture coordinates, starting at GX_TEXCOORD0, that are available to the GXSetTevOrder function.

Input texture coordinates go through the texture coordinate generation hardware. GXInit initializes the hardware (by calling this API) so that all texture coordinates are transformed by the GX_IDENTITY matrix in order to appear as if input coordinates are passed unchanged through to the texture hardware.

The enumeration GXTexMtx defines a default set of texture matrix names that can be supplied as mtx. The matrix names are actually row addresses (4 floats per row) in the matrix memory that indicate the first row of a loaded matrix. Modelview matrices and texture matrices share matrix memory in the example embodiment.

Example: Generating Texture Coordinates From Vertex Lighting Results

This type of texture coordinate generation can be used to create cartoon lighting effects. One of the color channel results is converted into texture coordinates.

GX_TG_SRTG

The s-coordinate is set equal to the 8-bit red component of the channel. The t-coordinate is set equal to the 8-bit green component of the color channel. For cartoon lighting, the s-coordinate will represent the light intensity and is input to an arbitrary 1D texture look-up to convert intensity to color. The t-coordinate is used to represent material color, and is used to select a 1D table from a 2D texture. Texture coordinates generated using the GX_TG_SRTG function should be generated after any coordinates generated by transforms (GX_TG_MTX2×4 or GX_TG_MTX3×4) and the bump map function (GX-TG_BUMP0–3).

The texture which represents the array of 1D intensity-to-color tables should be constructed carefully in the example embodiment. Each table (row) should be duplicated. Since the s- and t-coordinates are generated from 8-bit colors, a maximum texture of 256×256 can be used. For this texture size, there are 127 tables available ((256−1)/2).

An example rule for generating the green channel color which will create a t-coordinate centered properly in the 2-row table is:

n=1-D intensity lookup table index (0–126 for a 256×256 texture)
rows=number of rows in the texture, multiple of 2 if
((2*n+1)<((rows−1)/2))
  green=2*n +1
else
  green=2*n

EXAMPLE

// convert color0 to s,t for 2-D texture lookup, matrix not used  GXSetTexCoodGen(GX_TEXCOORD2, GX_TG_SRTG,  GX_TG_COLOR0, GX_IDENTITY);

Functional Ordering

Texture coordinates are generated in the functional order in the example embodiment: all transforms first (GX_TG_

MTX2×4 or GX_TG_MTX3×4), followed by bump maps (GX_TG_BUMP0–3), followed by texture coordinate generation from lighting (GX_TG_SRTG).

GXSetNumTexGens

Description

This function sets the number of texture coordinates that are generated and available for use in the Texture Environment (TEV) stages. Texture coordinates are generated from input data as described by GXSetTexCoordGen. The generated texture coordinates are linked to specific textures and specific Texture Environment (TEV) stages using GXSetTevOrder.

A consecutive number of texture coordinates may be generated, starting at GX_TEXCOORD0. A maximum of 8 texture coordinates may be generated. If nTexGens is set to 0, no texture coordinates will be generated. In this case, at least one color channel must be output, see GXSetNumChans.

Arguments nTexGens is Number of texture coordinates to generate.

Example Usage:

void GXSetNumTexGens(u8 nTexGens);

GXSetNumChans

Description

This function sets the number of lighting color channels that are output to the Texture Environment (TEV) stages. Color channels are the mechanism used to compute per-vertex lighting effects. Color channels are controlled using GXSetChanCtrl. Color channels are generally linked to specific Texture Environment (TEV) stages .

This function basically defines the number of per-vertex colors that get rasterized. If nChans is set to 0, then at least one texture coordinate must be generated, see GXSetNumTexGens. If nChans is set to 1, then channel GX_COLOR0A0 will be rasterized. If nChans is set to 2 (the maximum value), then GX_COLOR0A0 and GX_COLOR1A1 will be rasterized.

Arguments nChans is Number of color channels to rasterize.

Example Usage:

void GXSetNumChans(u8 nChans);

GXSetChanCtrl

Description

This function sets the lighting controls for a color channel. The color channel can have one or more (up to 8) lights associated with it, set using light_mask. The diff_fn and attn_fn parameters control the lighting equation for all lights associated with this channel. The amb_src and mat_src can be used to select whether the input source colors come from register colors or vertex colors.

When the channel enable is set to GX_FALSE, the material color source (set by mat_src) is passed through as the channel's output color. When the channel enable is GX_TRUE, the output color depends on the settings of the other controls (i.e., the lighting equation). GXInit sets the enable for all channels to GX FALSE. GXSetChanCtrl configures the lighting channel. To output the result of the channel computation, use the function GXSetNumChans.

Even though channels GX_COLOR0 and GX_ALPHA0 are controlled separately for lighting, they are rasterized together as one RGBA color, effectively GX_COLOR0A0. The same is true for GX_COLOR1 and GX_ALPHA1— effectively, they are rasterized as GX_COLOR1A1 . Since there is only one rasterizer for color in the graphics hardware, the application chooses which color to rasterize for each stage in the Texture Environment (Tev) unit. This is accomplished using the GXSetTevOrder function.

In order to use a vertex color in channel GX_COLOR1A1, two colors per vertex are be supplied, i.e. both GX_VA_CLR0 and GX_VA_CLR1 are be enabled in the current vertex descriptor. If only GX_VA_CLR0 or GX_VA_CLR1 is enabled in the current vertex descriptor, the vertex color is directed to the channel GX_VA_COLOR0A0.

When amb_src is set to GX_SRC_REG, the color set by GXSetChanAmbColor is used as the ambient color. When mat_src is GX_SRC_REG, the color set by GXSetChanMatColor is used as the material color.

Arguments

| | |
|---|---|
| chan | Color channel. |
| enable | Enable lighting for this color channel if enable = GX_ENABLE. |
| amb_src | Source for ambient color. |
| mat_src | Source for material color |
| light_mask | Lights used in the lighting equation for this channel. |
| diff_fn | Diffuse function for lighting |
| attn_fn | Attenuation function for lighting. |

Example Usage:

void GXSetChanCtrl(
      GXChannelID chan,
      GXBool enable,
      GXColorSrc amb_src,
      GXColorSrc mat_src,
      GXLightID light_mask,
      GXDiffuseFn diff_fn,
      GXAttnFn attn_fn);

Example: Local Diffuse Spot Light

This example demonstrates how to configure the GX_COLOR0 channel to light the vertex color with a local diffuse spot light. The functions GXInitLightPos and GXInitLightDir are used to initialize the light position and direction. The light direction and position are assumed to have been transformed into view space prior to setting the light object. In order to enable diffuse lighting, diff_fn is set to GX_DF_CLAMP. Since this is a spot light, attn_fn is set to GX_AF_SPOT. The type of spot light angle attenuation function is determined by the light, set here by GXInitLightSpot. The distance attenuation function is set using GXInitLightDistAttn.

```
// Assumes vertex will supply color0.
// init light position, direction, atten functions
GxInitLightPosv( &myLightObj, &pos);
GXInitLightDirv( &myLightObj, &dir);
GxInitLightSpot( &myLightObj, 30.0f, GX_SP_COS2);
GXInitLightDistAttn( &myLightObj, 100.0f, 0.5f, GX_DA_GENTLE);
GXLoadLightObjImm( &myLightObj, GX_LIGHT0 );
GXSetChanAmbColor( GX_COLOR0, black);
GXSetChanCtrl(
    GX_COLOR0,
    GX_TRUE,         // enable lighting
    GX_SRC_REG,      // ambient = 0
    GX_SRC_VTX,      // material color
    GX_LIGHT0,
    GX_DF_CLAMP,     // normal diffuse light
    GX_AF_SPOT);     // spot light attenuation
```

```
// Set number of channels to light
GXSetNumChans( 1 );
```

Example: Specular Light

This example demonstrates how to set up the GX_COLOR0 channel for specular lighting. The function GXInitSpecularDir is used to set the light direction. The direction must be transformed to view space prior to initializing the light object. Specular lights are considered to be infinitely far away, so a position parameter is not necessary. The angle attenuation and distance attenuation functions are used to approximate an exponential attenuation function for specular lights. Call GXInitLightShininess to control how shiny the lighted material appears (sets the attenuation parameters). The attn_fn is set to GX_AF_SPEC, enabling the specular computation.

```
// Assumes vertex will supply color0.
// init light direction, attn functions
CXInitSpecularDirv( &myLightObj, &dir);
GXInitLightShininess( &myLightObj, 5.0f);
GxLoadLightObjImm( &myLightObj, GX_LIGHT0 );
GXSetChanAmbColor( GX_COLOR0, black );
GXSetChanCtrl(
    GX_COLOR0,
    GX_TRUE,        // enable lighting
    GX_SRC_REG,     // ambient = 0
    GX_SRC_VTX,     // material color
    GX_LIGHT0,
    GX_DF_NONE,     // no diffuse light
    GX_AF_SPEC);    // specular light
// Set number of channels to light
GXSetNumChans( 1 );
```

Example: Parallel Directional Diffuse Light

Although the hardware doesn't support parallel directional diffuse lights, it is possible to obtain "almost parallel" lights by putting a light very far away from every objects to be lit. If the light position is very far from an object, all rays can be considered parallel.

```
// prepares large number (a2 pow 20)
#define LARGE_NUMBER 1048576
// light direction on view space
// the 3D vector (dx, dy, dz) is supporsed to be normalized.
f32 dx, dy, dz;
// init light parameters
GXInitLightPos(
    &myLightObj,
    - dx * LARGE_NUMBER,
    - dy * LARGE_NUMBER,
    - dz * LARGE_NUMBER);
GXInitLightColor( &myLightObj, white);
GXLoadLightObjImm( &myLightObj, GX_LIGHT0 );
GXSetChanAmbColor( GX_COLOR0, ambColor);
GXSetChanMatColor( GX_COLOR0, matColor);
GXSetChanCtrl(
    GX_COLOR0,
    GX_TRUE,        // enable lighting
    GX_SRC_REG,     // ambient = black
    GX_SRC_REG,     // material color
    GX_LIGHT0,
    GX_DF_CLAMP,    // normal diffuse light
    GX_AF_NONE );   // no attenuation
// Set number of channels to light
GXSetNumChans( 1 );
```

Light can be Used in Both Diffuse and Specular Channels

Which calculation is performed in a channel, either local-diffuse or specular, is determined by the channel controls. The light (that's associated with the channel) parameters normally are set with one of these computations in mind. For example, the application sets a position and direction for local diffuse lights (used with a diffuse channel) and set only the direction for a specular light (used with a specular channel). However, if the application only needs a directional diffuse light (the light's position is very far away so all the light's rays are considered parallel), then the same light's parameters can be used for both specular and diffuse channels. In this case, initialize the light's parameters using GXInitSpecularDir.

Example: Per-vertex Light With Pre-lighting

This example will add a pre-lit color (e.g., computed by an art tool) supplied as the per-vertex GX_VA_CLR0 (see GXSetVtxDesc) to the result of a diffuse local light. In this example we want to implement the equation:

$$lit\_clr = pre\_lit\_clr * (amb\_scale + diff\_scale * other\_atten * lit\_color)$$

The ambient scale defines the minimum amount of pre-lit color when no lights are shining on an object. The sum of amb_scale and diff_scale should equal 1.0, so when the object is in the brightest light, the vertex color is equal to the pre-lit color.

The material color is configured to be the per-vertex color (pre-lit color). The ambient color register is set equal to the amb_scale. The light color is scaled by the diff_scale.

```
//
// Assumes vertex will supply color0 = pre-lit color.
//
GXInitLightColor(
    myLightObj,
    ScaleColor(myLitClr, 0.75)); // diffuse scale
//
// init light position, direction, atten functions
// not shown
GXLoadLightObjImm(
    myLightObj,
    GX_LIGHT0);
GXSetChanAmbColor(
    GX_COLOR0,
    ScaleColor(white, 0.25)); // ambient scale
GXSetChanCtrl(
    GX_COLOR0,
    GX_TRUE,        // enable lighting
    GX_SRC_REG,     // ambient scale
    GX_SRC_VTX,     // mnaterial color = pre-lit color(vtx)
    GX_LIGHT0,
    GX_DF_CLAMP,    // normal diffuse light
    GX_AF_SPOT);    // spot light attenuation
//
// Set the material color register
GXSetChanMatColor( GX_COLOR0, (GXColor){0xff,0x00,0x80,0xff} );
GXSetNumChans( 1 );
```

Example: Four Attenuations for Projected Lights

This example shows how to compute local-light attenuation values for four projected-texture lights. No colors are provided per-vertex. The material color comes from the channel material register and is set to pass the attenuation (multiply by 1.0). There is no contribution from the ambient color. Each channel can be used to attenuate a projected texture in the Texture Environment (Tev) unit.

```
// Assumes that 4 light objects have been initialized and
   loaded
//
GXSetChanCtrl(
   GX_COLOR0,
   GX_TRUE,
   GX_SRC_REG,
   GX_SRC_REG,
   GX_LIGHT0,
   GX_DF_CLAMP,
   GX_AF_SPOT);
GXSetChanCtrl(
   GX_ALPHA0,
   GX_TRUE,
   GX_SRC_REG,
   GX_SRC_REG,
   GX_LIGHT1,
   GX_DF_CLAMP,
   GX_AF_SPOT);
GXSetChanCtrl(
   GX_COLOR1,
   GX_TRUE,
   GX_SRC_REG,
   GX_SRC_REG,
   GX_LIGHT2, GX_DF_CLAMP,
   GX_AF_SPOT);
GXSetChanCtrl(
   GX_ALPHA1,
   GX_TRUE,
   GX_SRC_REG,
   GX_SRC_REG,
   GX_LIGHT3,
   GX_DF_CLAMP,
   GX_AF_SPOT);
GXSetChanMatColor(  GX_COLOR0A0,
   WhiteOpaque);
GXSetChanMatColor(  GX_COLOR1A1,
   WhiteOpaque);
GXSetChanAmbColor( GX_COLOR0A0, BlackXlu);
GXSetChanAmbColor( GX_COLOR1A1, BlackXlu);
GXSetNumChans(2);
```

GXSetChanMatColor

Description

This function sets the material color register for color channel chan. The material color is used for the channel if the material source, as set by GXSetChanCtrl, is GX_SRC_REG.

Arguments chan=Color channel.

Example Usage:

```
void GXSetChanMatColor(
   GXChannelID chan,
   GXColor mat_color);
```

Illustrative Example

The following example application programming interface functions and associated parameters can be used to generate texture coordinates with an unclamped diffuse lighting function or in the red component of the lit color in each vertex is used to generate a texture coordinate for looking up a one-dimensional texture map, and the second texture coordinate can be generated by the green component and used to select a one-dimensional texture line from the two-dimensional texture map:

| Function | Parameters | Description |
| --- | --- | --- |
| GXInitLightPos | position (x, y, z) | various |
| GXInitLightColor | color | appropriate value |
| | channel ID | always GX_COLOR0A0 |
| | channel enable | always GX_ENABLE |
| | ambient source | always register src |
| GXSetChanCtrl | material source | always register src |
| | light mask | always GX_LIGHT0 |
| | diffuse function | always GX_DF_SIGN |
| | attenuation function | always GX_AF_NONE |
| GXSetChanAmbColor | color | appropriate value |
| GXSetChanMatColor | color | appropriate value |
| | destination coord | always GX_TEXCORD0 |
| GXSetTexCoord Gen | texgen function type | always GX_TG_SRTG |
| | source | always GX_TG_COOR0 |
| | matrix | always GX_IDENTITY |

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or McIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing,. 3D graphics, sound, peripheral and other capabilities of the home video game console platform for which the game programmer wrote the game software.

Figure 21A:
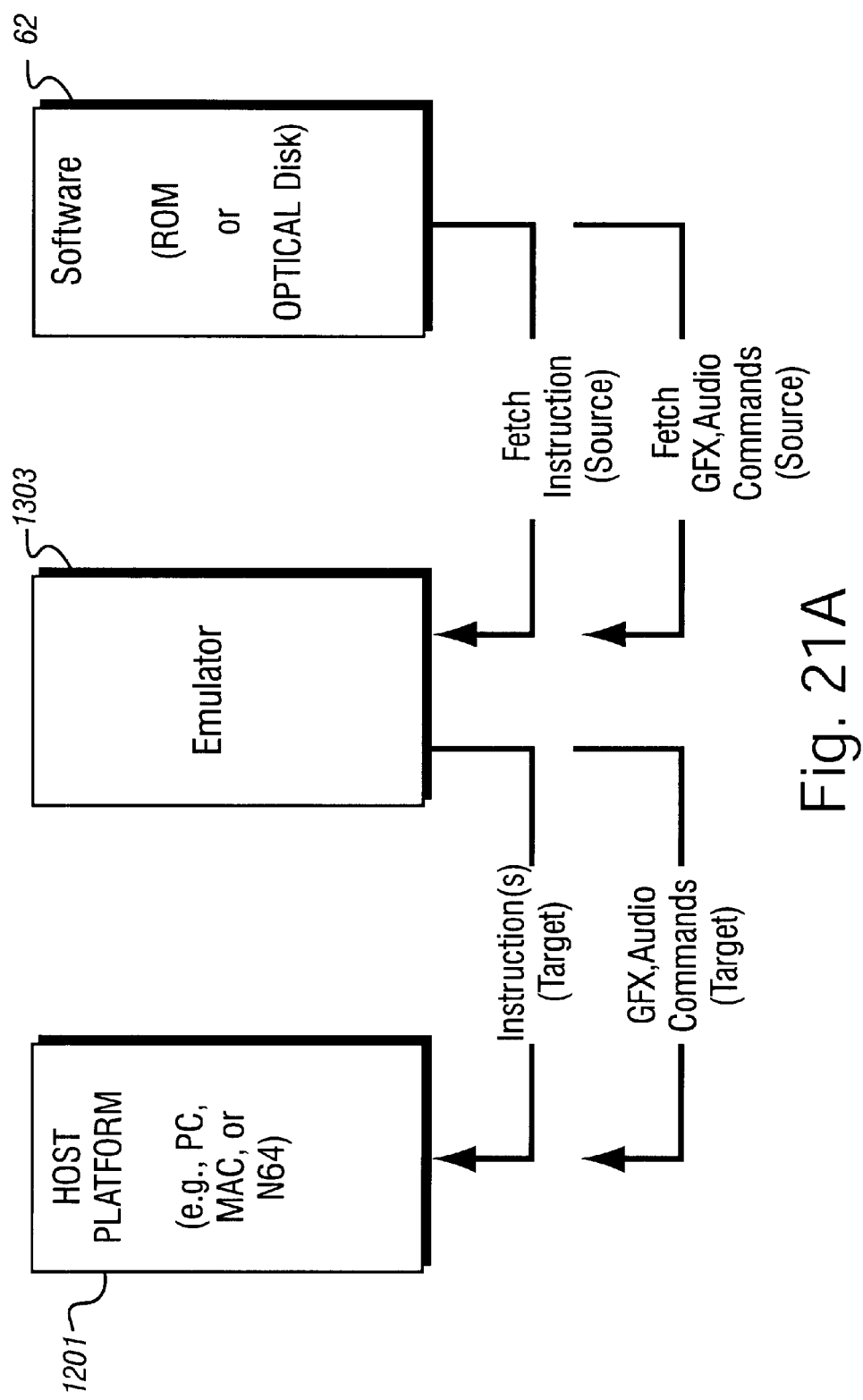
FIGS. 21A and 21B show example alternative compatible implementations.

FIG. 21A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 21B:
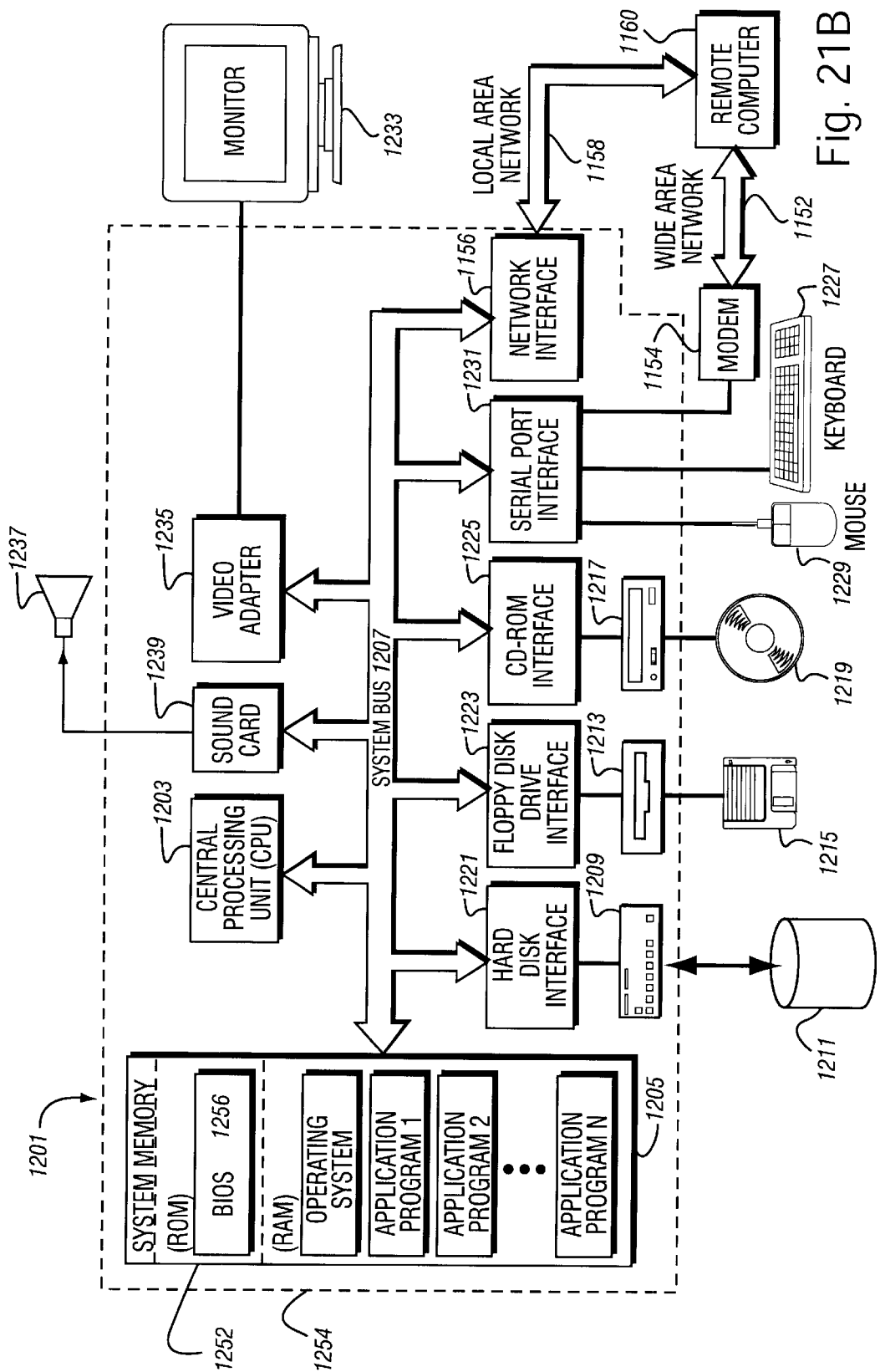

FIG. 21B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims. For example, as will be appreciated, although a particular cartoon lighting example is disclosed herein, the invention is not to be limited to cartoon lighting but rather, encompasses a variety of photo-realistic and non-photorealistic, texture-based and non-texture-based applications and effects that may be accomplished using an achromatic lighting parameter.

We claim:

1. A method of generating graphics images comprising:
   defining at least one per-vertex lighting function;
   using the per-vertex lighting function to calculate at least one parameter other than color or opacity;
   subsequently using said calculated at least one parameter to modify a color or opacity; and
   rendering an image based at least in part on the modified color or opacity.

2. The method of claim 1 wherein the parameter comprises at least one texture coordinate.

3. The method of claim 1 wherein the lighting function calculates said at least one parameter based at least in part on distance attenuation between a vertex and a light source.

4. The method of claim 1 wherein said lighting function calculates said at least one parameter based at least in part on the angle between the light source to vertex direction and the surface normal.

5. The method of claim 1 wherein said lighting function calculates said at least one parameter based at least in part on a vertex vector position.

6. The method of claim 1 wherein said lighting function defines a function based upon surface position, surface orientation and the position of at least one light.

7. The method of claim 1 wherein said lighting function uses either diffuse or specular lighting.

8. The method of claim 1 wherein the rendering step comprises generating a texture for a surface based at least in part on said parameter.

9. The method of claim 1 wherein said rendering step comprises texture mapping using a one-dimensional texture indexed by said at least one parameter.

10. The method of claim 1 wherein the generated parameters can be either host computed or computed using the lighting function, as required.

11. The method of claim 1 wherein one generated parameter is used to select a texel within a 1D texture and a second parameter is used to select which 1D texture to use.

12. A method of generating graphics images comprising:

defining at least one per-vertex lighting function;

using the lighting function to calculate at least one parameter other than color or opacity to be used in a subsequent modification of a color or opacity; and rendering an image based at least in part on the calculated parameter;

wherein said lighting function calculates a negative parameter for back lighting.

13. A method of cartoon lighting comprising:

using a lighting function to generate at least one color or opacity value;

converting said at least one color or opacity value to at least one texture coordinate;

using said texture coordinate in at least one texture mapping operation; and using the results of said texture mapping operation to modify the color or opacity of at least one visible surface in a dynamically generated cartoon image.

14. The method of claim 13 wherein said texture mapping operation comprises mapping a one-dimensional texture in response to said texture coordinate.

15. The method of claim 13 wherein said texture mapping comprises mapping brush strokes to dynamic lighting computation outputs.

16. The method of claim 13 wherein said lighting function comprises a diffuse lighting function.

17. The method of claim 13 wherein said lighting function comprises a specular lighting function.

18. The method of claim 13 wherein said lighting function comprises a distance-attenuated lighting function.

19. The method of claim 13 wherein said lighting function comprises a spotlight lighting function.

20. The method of claim 13 wherein said lighting function defines a first texture coordinate for said texture mapping and a second texture coordinate for said texture mapping is derived from a source other than said lighting function.

21. A method of cartoon lighting comprising:

using a lighting function to generate at least one color or opacity value;

converting said color or opacity value to at least one texture coordinate;

using said texture coordinate in at least one texture mapping operation; and using the results of said texture mapping operation to modify the color or opacity of at least one visible surface in a dynamically generated cartoon image;

wherein said texture coordinate can range negatively to define cartoon backlighting.

22. A graphics system comprising:

a lighting data pipeline comprising at least first and second channels, said lighting data pipeline receiving per-vertex information and lighting definitions; and calculating lit vertex parameters in response to said per-vertex and lighting definitions;

a texture unit coupled to said lighting data pipeline, said texture unit being responsive to at least one texture coordinate, said texture unit performing at least one texture mapping operation using at least one of said lighting data pipeline outputs as said at least one texture coordinate; and a blender coupled to said lighting data pipeline and said texture unit, said blender blending chromatic and/or opacity information obtained from said lighting data pipeline with texels obtained from said texture unit to provide a rendered image.

* * * * *